(12) United States Patent
Greeson

(10) Patent No.: US 11,947,190 B2
(45) Date of Patent: Apr. 2, 2024

(54) MULTI-CHAMBER FLUID CARTRIDGE FOR SMART AUTOMATED CONTACT LENS CLEANSING DEVICE

(71) Applicant: Austin Greeson, Ventura, CA (US)

(72) Inventor: Austin Greeson, Ventura, CA (US)

( * ) Notice: Subject to any disclaimer, the term of this patent is extended or adjusted under 35 U.S.C. 154(b) by 0 days.

(21) Appl. No.: 17/863,553

(22) Filed: Jul. 13, 2022

(65) Prior Publication Data

US 2022/0350175 A1 Nov. 3, 2022

Related U.S. Application Data

(63) Continuation of application No. 16/919,026, filed on Jul. 1, 2020, now Pat. No. 11,409,138, which is a continuation of application No. 16/114,954, filed on Aug. 28, 2018, now Pat. No. 10,705,352, which is a continuation of application No. 15/857,450, filed on Dec. 28, 2017, now Pat. No. 10,101,599.

(51) Int. Cl.
*G02C 13/00* (2006.01)
(52) U.S. Cl.
CPC ......... *G02C 13/006* (2013.01); *G02C 13/008* (2013.01)
(58) Field of Classification Search
None
See application file for complete search history.

(56) References Cited

U.S. PATENT DOCUMENTS

| | | |
|---|---|---|
| 3,394,717 A | 7/1968 | Hollinger |
| 4,582,076 A | 4/1986 | Prat |
| 4,986,290 A | 1/1991 | Oguma et al. |
| 5,105,841 A | 4/1992 | Oguma et al. |
| 10,101,599 B1 | 10/2018 | Greeson |
| 2005/0186128 A1 | 8/2005 | Pinchassi Dar et al. |
| 2008/0107151 A1* | 5/2008 | Khadkikar ............ G01F 23/22 374/141 |

(Continued)

FOREIGN PATENT DOCUMENTS

| | | | |
|---|---|---|---|
| DE | 202008002792 U1 * | 6/2008 | ........... A45C 11/005 |
| TW | 201302567 A * | 1/2013 | ................ A61J 1/03 |

OTHER PUBLICATIONS

Google Patents translation of DE202008002792U1 (Year: 2023).*

(Continued)

*Primary Examiner* — Eric W Golightly
(74) *Attorney, Agent, or Firm* — Norton Rose Fulbright US LLP

(57) ABSTRACT

A multi-chamber fluid cartridge is configured for storage of unused cleansing solution to be used by an automated contact lens cleansing device and for storage of used cleansing solution drained from the device. For example, the multi-chamber fluid cartridge may include a first chamber configured to store the unused cleansing solution and a second chamber configured to store the used cleansing solution. After being reversibly mated with the automated contact lens cleansing device, a controlled amount of the unused cleansing solution may be transferred from the first chamber to a reservoir within the automated contact lens cleansing device for performance of one or more cleansing cycles. Upon completion of the cleansing cycles, the used cleansing solution may be drained from the reservoir to the second chamber for storage until replacement of the multi-chamber fluid cartridge.

14 Claims, 17 Drawing Sheets

(56) References Cited

U.S. PATENT DOCUMENTS

| | | |
|---|---|---|
| 2009/0211925 A1 | 8/2009 | Doniga |
| 2009/0229999 A1 | 9/2009 | Haggin |
| 2011/0084834 A1 | 4/2011 | Sabeta |
| 2016/0193378 A1 | 7/2016 | Pugh et al. |

OTHER PUBLICATIONS

Google Patents translation of TW201302567A (Year: 2023).*
International Search Report and Written Opinion issued for PCT Application No. PCT/US2018/067527, dated Mar. 25, 2019, 9 pages, filed with U.S. Appl. No. 16/114,954 IDS filed Apr. 9, 2019.

* cited by examiner

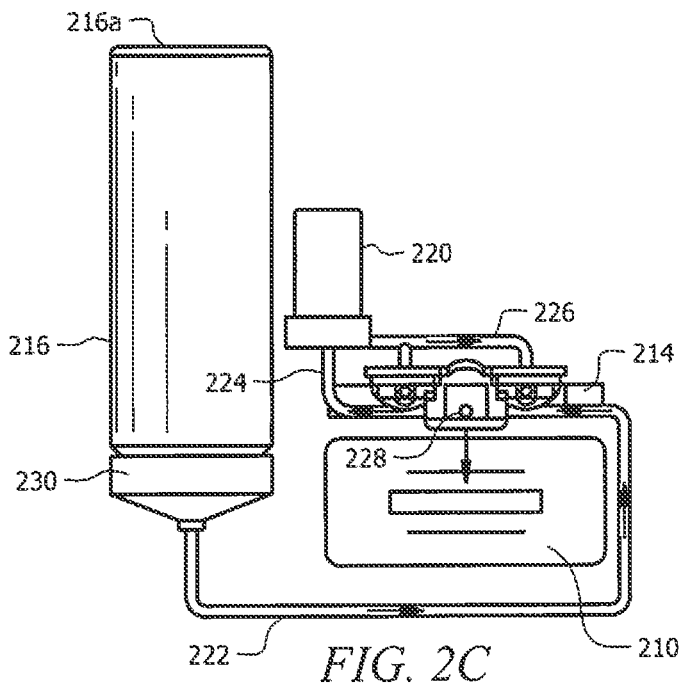
FIG. 2C
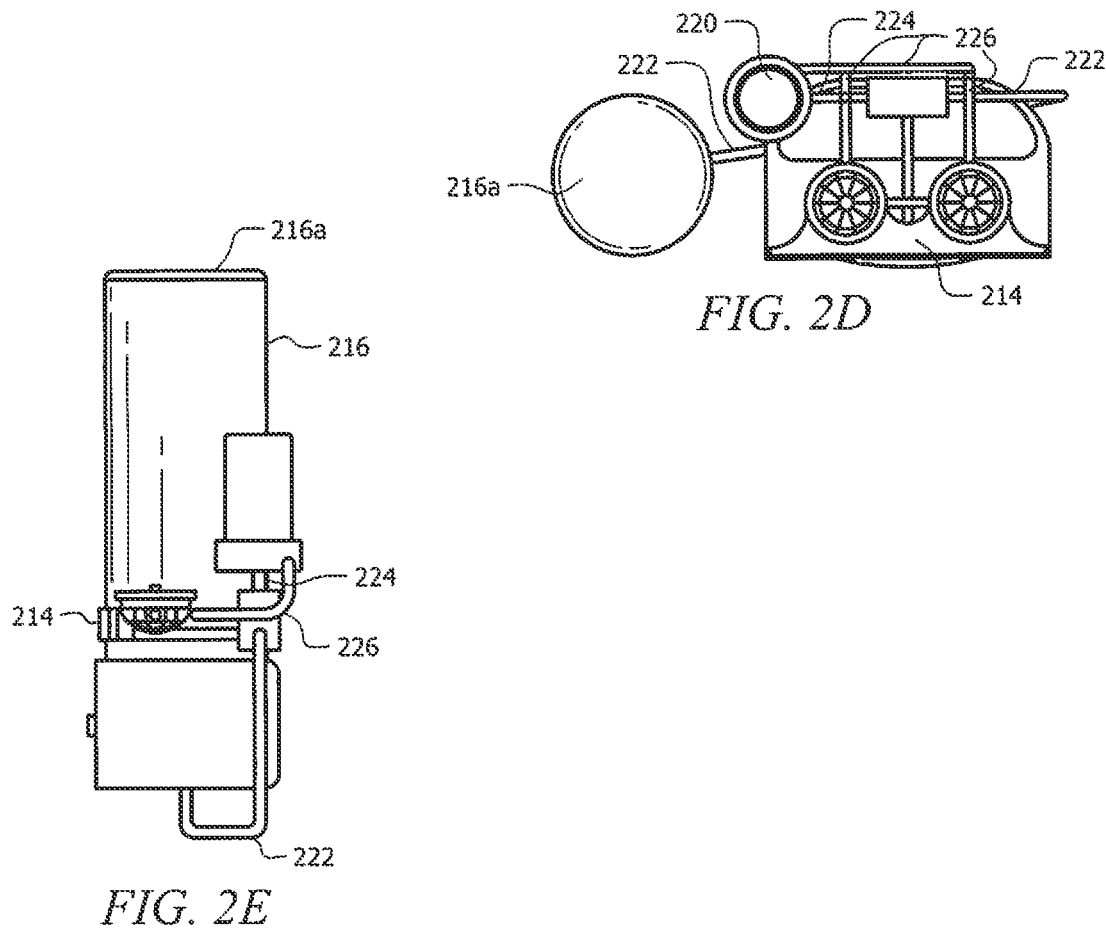
FIG. 2D
FIG. 2E

1100

1102 — REVERSIBLY MATE A MULTI-CHAMBER FLUID CARTRIDGE TO AN AUTOMATED CONTACT LENS CLEANSING DEVICE, THE MULTI-CHAMBER FLUID CARTRIDGE INCLUDING A FIRST CHAMBER CONFIGURED TO STORE UNUSED CLEANSING SOLUTION FOR USE BY THE AUTOMATED CONTACT LENS CLEANSING DEVICE AND A SECOND CHAMBER CONFIGURED TO STORE USED CLEANSING SOLUTION THAT IS DRAINED FROM THE AUTOMATED CONTACT LENS CLEANSING DEVICE, THE SECOND CHAMBER PHYSICALLY ISOLATED FROM THE FIRST CHAMBER

1104 — TRANSFERRING, AT A FIRST SOLUTION TRANSFER LINE OF THE AUTOMATED CONTACT LENS CLEANSING DEVICE, A FIRST PORTION OF THE UNUSED CLEANSING SOLUTION FROM THE FIRST CHAMBER OF THE MULTI-CHAMBER FLUID CARTRIDGE TO A RESERVOIR OF THE AUTOMATED CONTACT LENS CLEANSING DEVICE

1106 — CIRCULATING THE FIRST PORTION OF THE UNUSED CLEANSING SOLUTION THROUGH THE RESERVOIR FOR A DURATION OF THE AT LEAST ONE CLEANSING CYCLE, WHERE AFTER CIRCULATION THE FIRST PORTION OF THE UNUSED CLEANSING SOLUTION INCLUDES A FIRST PORTION OF THE USED CLEANSING SOLUTION

1108 — TRANSFERRING, AT A SECOND SOLUTION TRANSFER LINE OF THE AUTOMATED CONTACT LENS CLEANSING DEVICE, THE FIRST PORTION OF THE USED CLEANSING SOLUTION FROM THE RESERVOIR TO THE SECOND CHAMBER OF THE MULTI-CHAMBER FLUID CARTRIDGE

*FIG. 11*

MULTI-CHAMBER FLUID CARTRIDGE FOR SMART AUTOMATED CONTACT LENS CLEANSING DEVICE

CROSS-REFERENCE TO RELATED APPLICATIONS

This application is a continuation-in-part of U.S. patent application Ser. No. 16/919,026, filed Jul. 1, 2020, issued as U.S. Pat. No. 11,409,138 on Aug. 9, 2022, and entitled "SMART AUTOMATED CONTACT LENS CLEANSING DEVICE", which is a continuation of U.S. patent application Ser. No. 16/114,954, filed Aug. 28, 2018, issued as U.S. Pat. No. 10,705,352 on Jul. 7, 2020, and entitled "SMART AUTOMATED CONTACT LENS CLEANSING DEVICE", which is a continuation of U.S. patent application Ser. No. 15/857,450, filed Dec. 28, 2017, issued as U.S. Pat. No. 10,101,599, issued on Oct. 16, 2018, and entitled "SMART AUTOMATED CONTACT LENS CLEANSING DEVICE"; the disclosures of which are herein incorporated in their entirety.

TECHNICAL FIELD

The present disclosure generally relates to automated cleansing devices and fluid storage solutions thereof. Specifically, the present disclosure relates to multi-chamber fluid cartridges configured to reversibly mate with smart automated cleansing devices that communicate wirelessly and can be effectively utilized to cleanse, e.g., contact lenses.

BACKGROUND

Contact lenses are a popular means of correcting eyesight and/or changing the color or appearance of eyes. As the technology of contact lenses has evolved, soft contact lenses have been made available by the eye correction industry. Soft contact lenses can be worn for a threshold amount of time per day (a wear threshold). The wear threshold can vary from one contact lens to another, but once the wear threshold expires, it is intended that a user will remove the contact lenses from their eyes.

Some soft contact lenses are reusable for a period of time. For example, soft contact lenses can be reused ten (10) times, thirty (30) times, or the like (a use threshold). In order to ensure cleanliness over an extended period of days, reusable contact lenses are often cleansed between uses. For example, upon expiration of a wear threshold, a user is expected to remove the contact lenses and perform a cleansing routine to cleanse the lenses. Thereafter, the user is expected to store the contact lenses in a sterile, moist environment during a time period the user should not wear contact lenses to avoid fatigue (a resting threshold). Once the resting threshold expires, a user has the option of reusing that contact lens by reinserting the lens into the user's eye. Accordingly, the same contact lens can be used, cleansed, stored, and reused until its use threshold expires. Once the use threshold expires, the user is expected to dispose of the contact lens and begin using a new lens.

In theory, reusable lenses are cost effective, convenient, clean, and pose few risks to the user's eyes. That said, hygiene is one of the most important factors in preventing infections and other problems that affect the short term health of eyes as well as long-term vision. In practice, it has been discovered that users often refuse or forget to follow their prescribed cleansing and sanitary storing routines. This can result from the fact that a manual cleansing process is arduous.

According to a manual cleansing process, a user is instructed to wash his or her hands prior to touching the contact lens or anything that will touch the contact lens. Then, the user removes a contact lens from his or her eye and places it in the palm of his or her clean hand. The user sprays fresh, unused contact lens cleansing solution over the contact lens and allows the solution to pool in the palm of his or her hand. The user rubs the front and back of the lens with a clean finger on their other hand. The user avoids touching the lens with their fingernails because they can carry bacteria and can cut or damage the lens. After having rubbed the lens' surface, the user rinses the lens with fresh, unused cleansing solution.

Once the lens is cleansed, the user places the lens in a clean contact lens storage case, which itself should be cleansed and dried before removing the contact lens from the eye. The contact lens storage case is cleansed by spraying the contact lens storage case with fresh, unused contact solution. Water should not be used to cleans a contact lens storage case because water is filled with bacteria, impurities, and microorganisms. After the contact lens storage case is properly cleansed, the contact lens storage case should be overturned and allowed to air dry. Contact lens storage cases should be stored at a distance from toilets to avoid contamination.

The user places the lens into the clean contact lens storage case and fills the contact lens storage case with fresh, unused contact solution. The user should use at least a threshold amount of fresh, unused contact solution, which can be indicated by a line on the contact lens storage case. The contact lens storage case should not be filled with used solution because used solution can lead to contamination. Once the contact lens storage case is filled with the threshold amount of fresh, unused contact solution, the contact lens remains submerged in the contact solution for a threshold cleansing time. The lens should not be removed before the threshold cleansing time expires to ensure any air bubbles clinging to the lens surface dissipate. This allows the solution to saturate the entire lens surface. Further, the threshold cleansing time allows the contact solution to fully dissolve proteins and lipids, which can build on the lens surface.

A user's lack of compliance with the foregoing regimen leads to major complications. Users often deposit proteins and lipids on the surface of a contact lens. Further, pollution and dirt deposit on the surface of a contact lens. As these deposits build up, users experience decreased vision, irritation, and conjunctivitis. Depending on the severity of conjunctivitis, a user can experience redness, itchiness, pain, and photophobia. The industry has attempted to reduce the complications associated with reusable soft contact lenses, but currently available solutions are ineffective or rejected by users.

One proposed solution involves reducing the use threshold. The idea is as follows: if users will not properly cleanse and store their contact lenses, then reducing the use threshold will cause the lenses to be disposed of before protein, lipids, pollution, and/or dirt deposits build to dangerous proportions. So the industry created soft contact lenses having reduced use thresholds as low as a single use. This solution seems plausible but has been ineffective in practice. That is, merely reducing the use threshold is prohibitively expensive. As of now, single use contact lenses cost significantly more than contact lenses having a longer use threshold. In some circumstances, users wear single-use lenses multiple times in order to save money, and such unintended use leads to protein and lipid build up, contamination, and eye infection.

Another proposed solution involves using an ultra-sonic machine to clean lenses using ultra-sonic vibrations. When the user is ready to remove their contact lenses, the user opens the lid of the ultra-sonic machine, removes his or her contact lenses, places the contact lenses in a basket inside the ultra-sonic machine, fills the ultra-sonic machine with a threshold amount of fresh, unused contact solution, closes the lid, and presses a button to initiate ultra-sonic vibrations. When initiated, ultra-sonic frequencies cause air bubbles to develop and move about the contact lenses. Manufactures of ultra-sonic machines assert that the generated air bubbles cleans the lenses in as little as two minutes and alleviate the user's previous need to rub the lenses with their fingers and store the lenses in solution for the threshold cleansing time. As such, according to manufactures of the ultra-sonic machines, the contact lenses are cleansed just as effectively with less time and less effort.

However, in practice, the industry has discovered the ultra-sonic machines leave much to be desired when it comes to cleansing contact lenses. While ultra-sonic vibrations cause air bubbles to move through the solution, they do not move in any particular direction. As such, it is only a matter of chance if air bubbles affixed to the lens surface dissipate prior during vibration. Air bubbles that fail to dissipate from lens surfaces prevent the lens from being properly cleansed and can lead to infection. As such, doctors recommend rubbing contact lenses prior to using the ultra-sonic machine, regardless of the manufacturer's instructions. In practice, users tend to follow procedures that are less time consuming, so they forget or choose to forgo the rubbing process, and ultra-sonic machines provide a false sense of security regarding contact cleanliness.

Further, contact lens cleansing solution has a recommended storage threshold, as explained above. To effectively ensure all air bubbles dissipate from the lens surface and all proteins and lipids are dissolved, it is recommended that contact lenses remain submerged in cleansing solution for a threshold cleansing time. The manufacturers of ultra-sonic machines tout that ultra-sonic technology cleanses lenses in about two minutes, after which the lenses can be removed from the machine. Such an instruction provides a false since of lens cleanliness because two minutes is insufficient for the cleansing solution to dissolve proteins and lipids. Thus, if the user removes the lenses from the ultra-sonic machine and inserts them into their eyes after two minutes of cleansing, at least two problems occur: (1) the user risks wearing lenses that are not sufficiently cleansed, and (2) the user's eyes can be susceptible to hypoxia (i.e., oxygen loss to the eye).

Therefore, to properly clean contact lenses while using an ultra-sonic machine, a user would remove the lenses from the ultra-sonic basket and store them in a storage case that is filled with fresh, unused solution. As can be seen, in order to properly clean lenses using an ultra-sonic machine, a user would first rub the lenses with their fingers, place the lenses in the ultra-sonic machine for two minutes, remove the lenses and store them in a storage container for the threshold cleansing time (and/or resting threshold time). Therefore, in use, the ultra-sonic machine adds steps to the contact lens cleansing process and provides a false sense of cleanliness that leads to an increased risk of eye infection.

Further, ultra-sonic machines must be cleansed. As with other lens cleansing devices, contact solution, rather than water, should be used to rinse the machines. In addition, to deep clean an ultra-sonic machine, a user unplugs the machine and allows it to rest for at least one hour. Then, the machine is wiped throughout with a sponge or cloth dampened with detergent and hot water. Thereafter, the machine is thoroughly rinsed to remove all soap residue. Being that water includes contaminates, rinsing with contact solution is recommended. It has been determined that users rarely, if ever, perform this cleansing regimen. Further, users often damage a machine's electronics during the cleansing process.

SUMMARY

In view of the foregoing, inventive concepts described herein simplify the contact lens cleansing regimen from the user's prospective, while increasing the cleanliness of reusable contact lenses from a sanitation perspective. Systems and methods herein involve a cleansing device that forces fresh, unused contact lens solution in a manner that jets the front and back surfaces of a contact lens with sufficient force to prevent air bubbles from clinging to surface areas of the lens. Further, the cleansing device submerges the contact lens in the fresh, unused contact cleansing solution for a controlled threshold cleansing time to ensure proper removal of contaminate build-ups on the contact lens. Further still, concepts described herein automatically cleanse and dry the cleansing device itself. As a result, the cleansing device can be made ready for another contact lens cleansing cycle prior to the user's next scheduled cleansing cycle.

Aspects of the described cleansing device automate the contact lens cleansing procedure, thereby increasing the probability that a cleansing cycle is performed according to doctor recommendations. For example, a user is less likely to use insufficient amounts of cleansing solution. A user is also less likely to reuse old, contaminated cleansing solution. The cleansing device reduces a user's likelihood of skipping steps that would remove air bubbles from the surface of contact lenses. Further, the cleansing device reduces the likelihood that contact lenses are removed from the cleansing solution prior to the prescribed threshold cleansing time.

In some aspects, a cleansing device includes one or more unused solution storage that receives a disposable receptacle having sterile solution therein. If the device includes more than one unused solution storage, the stored solutions can be different from each other. The device can further include a cleansing reservoir and a circulator that circulates solution drawn from the unused solution storage through the cleansing reservoir until a threshold amount of circulating time expires. Further, the device can include a drain line that releases the solution from the cleansing reservoir into a drain. The device can include a memory that stores at least one cleansing cycle; and a control processor that controls the circulator, the drain line, and the one or more unused solution storage according to a cleansing cycle of the at least one cleansing cycle stored in the memory.

In further aspects, the device can include a transceiver that receives one or more data structures that contain or relate to instructions to initiate a cleansing cycle. These received instructions can be stored and subsequently updated in memory. Instructions to initiate a cleansing cycle can be directed to a device self-cleansing cycle, a contact lens cleansing cycle, and/or a cycle that cleanses another item.

According to inventive concepts, the device can also include one or more sensors that collect data. The collected data can also be stored in memory and utilized to make decisions regarding certain functions to be performed. The data can, e.g., relate to a condition of device components, a condition of the user, and/or use of the device. In some aspects, a device transceiver communicates with a remote device and/or one or more nodes across one or more networks. Device outputs can convey information such as instructions for use, reminders, environmental conditions, device performance and maintenance reports, and the like. For example, a service call can be initiated based at least on some of the data.

According to other aspects, methods for controlling a cleansing device can comprise receiving and storing data structures containing or relating to instructions to initiate a cleansing cycle. A device processor can execute instructions to perform the cleansing cycle, which can comprise releasing a cleansing solution from a disposable sterile receptacle, circulating the solution until a threshold amount of circulating time expires, releasing a drain line, where the solution drains through the drain line.

Methods can also comprise collecting data relating to a condition of device components. The collected data can also be stored in memory and utilized to make decisions regarding certain functions to be performed. The data can, e.g., relate to a condition of device components, a condition of the user, and/or use of the device. In some aspects, a device transceiver communicates with a remote device and/or one or more nodes across one or more networks. Device outputs can convey information such as instructions for use, reminders, environmental conditions, device performance and maintenance reports, and the like. For example, a service call can be initiated based at least on some of the data.

In some aspects, a multi-chamber fluid cartridge may be used with an automated cleansing device, and the multi-chamber fluid cartridge may store unused cleansing solution to be used by the cleansing device and used cleansing solution drained from the cleansing device. For example, the multi-chamber fluid cartridge may include a first chamber configured to store the unused cleansing solution (e.g., sterile cleansing solution) and a second chamber configured to store the used cleansing solution. The multi-chamber fluid cartridge may be configured to reversibly mate with the cleansing device, such as by screwing in one or more nozzles or other mating components to similar components of the cleansing device configured to receive the cartridge. Once mated (e.g., coupled) to the cleansing device, a controlled amount of the unused cleansing solution may be transferred (e.g., via a first fluid transfer line) from the first chamber of the multi-chamber fluid cartridge to a reservoir within the cleansing device for performance of one or more cleansing cycles by the cleansing device, such as contact lens cleansing cycle(s), device self-cleansing cycle(s), or the like. Upon completion of the cleansing cycle(s), the used cleansing solution may be drained (e.g., via a second fluid transfer line) from the reservoir to the second chamber for storage until replacement of the multi-chamber fluid cartridge. As such, efficient storage of unused and used cleansing solution is provided by the multi-chamber fluid cartridge, without requiring frequent changes by a user or use of external components. In some implementations, an indicator on the multi-chamber fluid cartridge may be activated, or data may be transmitted to the cleansing device for display of a reminder via a user interface of the cleansing device, to indicate to the user that the unused cleansing solution is anticipated to run out in a particular time period (e.g., a week) and that a new cartridge should be ordered. In some implementations, a radio frequency identification (RFID) tag or other wireless transmitter may be affixed to or incorporated in the multi-chamber fluid cartridge in order to provide identification information, and the cleansing device may reject any cartridge that does not provide proper identification, thereby enabling a cartridge manufacturer (or their partners) to ensure that the cleansing device only operates using verified cartridges that store the proper cleansing solution.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present aspects, reference is now made to the following descriptions taken in conjunction with the accompanying figures, in which:

FIG. 2C shows other aspects of an exemplary implementation of a cleansing device as disclosed herein.

FIG. 2D shows other aspects of an exemplary implementation of a cleansing device as disclosed herein.

FIG. 2E shows other aspects of an exemplary implementation of a cleansing device as disclosed herein.

FIG. 11 is a flow diagram of an example of another method involving systems and devices disclosed herein.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Figure 1:
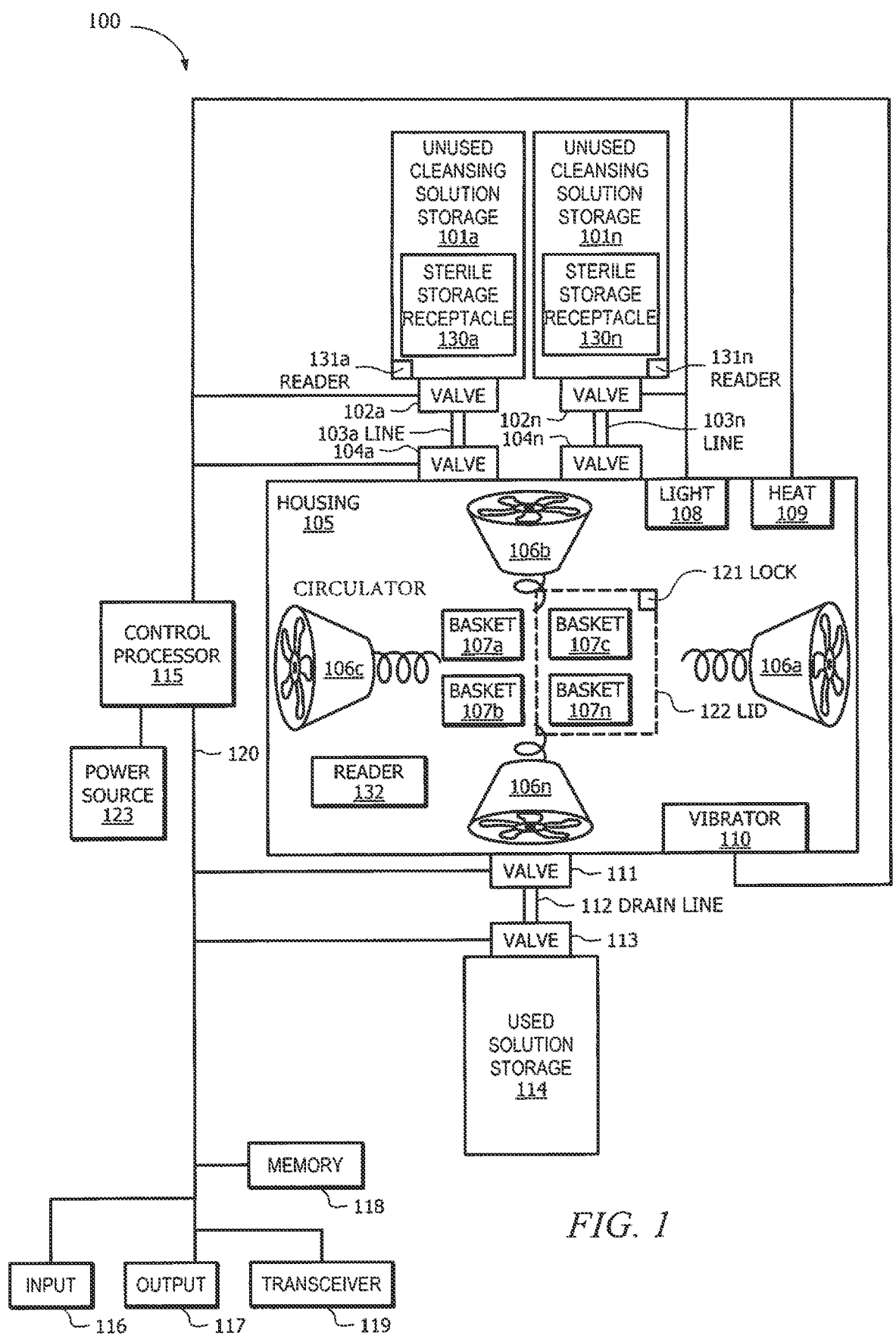
FIG. 1 is a block diagram of an exemplary implementation of a cleansing device as disclosed herein.

FIG. 1 illustrates certain aspects of exemplary cleansing device 100. In preferred implementations, cleansing device 100 cleanses one or more contact lenses. However, cleansing device 100 can be used to clean and/or sterilize any number of objects, for example, toothbrush heads, makeup utensils, manicure and pedicure utensils, eye glasses, jewelry, baby supplies, facial brushes, hair brushes, skin brushes, kitchen utensils, medical devices and utensils, surgical utensils, and more. Cleansing device 100 includes at least one housing 105. In some aspects, housing 105 includes circuitry that controls processes and operations of some or all components of cleansing device 100. The circuitry can include control processor 115, power source 123, memory 118, input 116, output 117, transceiver 119, communications link 120 (wired and/or wireless) that communicates information to and from various components of cleansing device 100, and/or more as is described in further detail below in FIG. 3.

Cleansing device 100 includes one, two, three, or more unused cleansing solution storage 101a-101n. In this example, unused cleansing solution storage 101a-101n stores fresh, unused cleansing solution, (e.g., contact cleansing solution, brush cleansing solution, utensil cleansing solution, jewelry cleansing solution, and/or any type of cleansing solution). An unlimited list of example sterile storage containers include but is not limited to: a cartridge, a syringe, a vessel, a bag, a bottle, a vial, a jar, a jug, a vacuum bottle, a cylinder, a tube, a capsule, a case, and/or any combination thereof, and/or the like). The sterile storage receptacle 130a-130n can be sealed prior to a user receiving the sterile storage receptacle 130a-130n (e.g., at a manufacturing site) thereby maintaining the sterility of the sterile storage receptacle 130a-130n and the cleansing solution therein. The sterile storage receptacle 130a-130n can be disposable and intended as a one-use sterile storage receptacle. The sterile storage receptacle 130a-130n can be shaped to compatibly fit within and remain stored within unused cleansing solution storage 101a-101n in any manner desired. For example, sterile storage receptacle 130a-130n can be shaped with a male coupling configuration while unused cleansing solution storage 101a can be shaped with a female coupling configuration, such that sterile storage receptacle 130a is received into unused cleansing solution storage 101a as a male to female coupling. In examples, sterile storage receptacle 130a-130n can include a seal, which can be pierced by unused cleansing solution storage 101a-101n during and/or after insertion of sterile storage receptacle 130a-130n, thereby preventing contamination of the component and cleansing solution stored therein.

In another example, unused cleansing solution storage 101a-101n can be a storage tank having a lid thereon. In some aspects, a user can open a bottle, vial, jar, and/or the like, and manually pour the unused, fresh cleansing solution into the unused cleansing solution storage 101a-101n, and close the lid thereon to contain the unused, fresh cleansing solution inside. In some aspects, unused cleansing solution storage 101a-101n can be connected to a pump that pumps unused, fresh cleansing solution into unused cleansing solution storage 101a-101n from a large sterile storage receptacle stored remotely from cleansing device 100. Any manner of storing and/or receiving unused, fresh cleansing solution into unused cleansing solution storage 101a-101n can be done.

Further, the manner of storing and/or receiving unused, fresh cleansing solution into unused cleansing solution storage 101a can be the same and/or different from the manner of storing and/or receiving unused, fresh cleansing solution into unused cleansing solution storage 101b-101n. Moreover, the shape, size, and design of unused cleansing solution storage 101a can be the same or different from unused cleansing solution storage 101b-101n. For example, unused cleansing solution storage 101a can be shaped to mate with a cartridge, while unused cleansing solution storage 101n can be configured to be manually filled via a removable lid, or automatically filled via a pump. In examples, the solution stored in unused cleansing solution storage 101a can be the same solution or a different solution from other unused cleansing solution storages 101b-101n. In examples, unused cleansing solution storage 101a can store a daily cleansing solution, while unused cleansing solution storage 101n can store a rinsing and/or storing solution. In other examples, unused cleansing solution storage 101a can store a daily cleansing solution, while unused cleansing solution storage 101n stores a solution that is used less frequently (e.g., a weekly enzyme solution). Further, one or more of unused cleansing solution storage 101a-101n can store and/or dispense tablets, particles, powder, a mixture, and/or other items, solid or not, (e.g., enzyme tablets, neutralizing powder, gaseous mixture, etc.) that can automatically and controllably be released, according to a set schedule, on demand, and/or the like. Further still, unused cleansing solution storage 101a can store a solution that cleanses contacts, while unused cleansing solution storage 101n can store a solution that cleanses the cleansing device 100 itself.

Yet further, one or more of unused cleansing solution storage 101a-101n can store and/or controllably dispense medication, prescription or otherwise, and/or other eye treatments. For example, unused cleansing solution storage 101a-101n can store one or more of, and/or a mixture of, Azelastine, Bepotastine 1.5%, Cromolyn, Acular-Ketorolac Ophthalmic, Artificial Tears, Atropine Ophthalmic, Avastin for macular degeneration, Brimondine Ophthalmic (Alphagan), Ciloxan Ointment, Erythromycin Ointment, Gentamicin eye drops, Levobunolol Ophthalmic (Betagan), Lucentis, Macugen, Metipranolol (Optipranolol), Optivar, Patanol, PredForte Ophthalmic, Proparacaine, Timoptic, Trusopt, Visudyne (Verteporfin), Voltaren, Xalatan, allergy medication and/or treatments, antibiotic medication and/or treatments, vitamins, and/or the like.

In some aspects, fresh, unused cleansing solution from one or more of unused cleansing solution storage 101a-101n can be collected and used for testing and diagnostic purposes. The testing and diagnostic purposes can test and diagnose one or more user of cleansing device 100 and/or be used in case studies involving a statistically significant number of subjects. One or more of unused cleansing solution storage 101a-101n can include testing and diagnostic sensors 131a-131n therein, that receive input (data) from the fresh, unused solution in the one or more of unused cleansing solution storage 101a-101n. The data can be communicated to control processor 115 and/or stored in memory 118. Control processor 115 can run analytics on the collected data and store the analytics in memory 118. Control processor 115 can display a graphics user interface (GUI) via output 117, which can be an LED screen and/or touch screen. Control processor 115 can transmit the analytics and/or the raw data from sensors 131a-131n to a central computing device (e.g., server, computer, laptop, smart watch, smart phone, tablet, and/or the like), as is described further below with reference to FIGS. 3-4.

In some aspects, collected data can indicate that additional unused, fresh cleansing solution should be ordered and/or which type of cleansing solution should be ordered. Such information can be conveyed on the GUI, and the GUI can provide a user with the ability to order the suggested cleansing solution using a touch screen of input/output 116/117. A user can have an online account having profile information including payment information, shipping information, preferences, health insurance information, and the like stored therein. With one or more clicks, a user can order additional products as is suggested in the GUI via the data collected from the testing and diagnostic sensors 131a-131n of unused cleansing solution storage 101a-101n. Other information can be conveyed as well, such as an indication that one or more component parts of cleansing device 100 is due for maintenance or should be replaced, repaired, sanitized, and/or the like.

Unused cleansing solution storage 101a can include a valve 102a that actuates to controllably release fresh, unused cleansing solution from unused cleansing solution storage 101a into line 103a. In some aspects, line 103a can couple to valve 104a that actuates to controllably release fresh, unused cleansing solution from line 103a into one or more portion of housing 105. Valves 102a and 104a can be controlled by control processor 115, as is further described below. Additional unused cleansing solution storages 101n can include valves 102n that actuates to controllably release fresh, unused cleansing solution from unused cleansing solution storages 101n into line 103n. In some aspects, line 103n can couple to valves 104n that actuates to controllably release fresh, unused cleansing solution from line 103n into one or more portions of housing 105. Valves 102n and 104n can also be controlled by control processor 115 as is further described below. Additional lines and valves can be included, as is desired to control the flow of fresh, unused cleansing solution.

Housing 105 includes one or more baskets 107a-107n, which can each store one or more items for cleansing. Additionally and/or alternatively, one or more of baskets 107a-107n can be a box, crate, bin, barrel, cradle, creel, hamper, pan, bassinet, and/or the like. Further, one or more of baskets 107a-107n can be the same shape, size, and/or design, and one or more of baskets 107a-107n can be a different same shape, size, and/or design. In this example, one or more baskets can store an item for cleansing therein. One or more of baskets 107a-107n can include a lid that can manually open and close (e.g., via a user's fingers). One or more of baskets 107a-107n can include a lid with an actuator that is controlled by control processor 115 such that the lid transitions between open and closed positions without a user touching the lids, thereby minimizing contamination of a basket by fingers opening the lid of the basket. For example, control processor 115 can employ mechanical, electrical, or magnetic actuation to actuate movement of a basket's lid and/or any component of cleansing device 100.

Baskets 107a-107n can be accessed individually and/or as one or more groups. In some aspects, housing 105 can include a lid and/or door that opens and closes such that one or more baskets 107a-107n is exposed simultaneously. For example, housing 105 can include lid 122, wherein baskets 107a-107n are accessible via lid 122. In another example, housing 105 can include two or more lids/doors that provide access to one or more specific baskets at a time. Baskets 107a-107n can be accessed via a drawer mechanism, for example, one or more of the baskets can slide open as a drawer. Some or all of the baskets can be accessed in the same or different manners. One or more of the lids, doors, drawers, and/or the like can include a locking mechanism. The one or more locking mechanism 121 can be controlled manually. In some aspects, control processor 115 can control one or more locking mechanism 121 according to one or more cleansing cycle. For example, housing 105 as a whole, and/or one or more baskets individually, can have controlled access based on a threshold minimum and/or maximum amount of time that a cleansing cycle is performed. One or more cleansing cycles can be performed to maintain items within the housing 105 and/or individualized baskets based on any of the one or more thresholds mentioned herein. Various thresholds can comprise time, temperature, use frequencies, sanitation test levels, litmus test levels, enzyme levels, protein levels, and/or the like.

Housing 105 can also include one or more circulators 106a-106n. In this example, circulators 106a-106n circulate solution. Additionally, and/or alternative, one or more of circulators 106a-106n can circulate air, particulates, solvents, a different solution, and/or the like. Circulators 106a-106n can be controlled by control processor 115 such that one or more circulators 106a-106n operates at the same or different speeds, at the same or different times, on the same or different cleansing cycles, and/or the like. One or more of the circulators 106a-106n can include one or more blades, propellers, struts, pumps, and/or the like that spin and/or move at one or more varying speeds on a spectrum from slow to fast. The spinning of blades and/or actuation of pumps can compress or squeeze air, solution, fluid, solvent, and/or the like, and blast, squirt, drive, and/or shoot the material out of a narrow portion of the circulator 106a-106n. One or more circulators 106a-106n can be the same and/or different as one or more of the circulators 106a-106n. One or more circulators 106a-106n can be bigger, smaller, wider, narrower, shorter, taller, and/or taper at a different tapering rate as compared to the circulators 106a-106n. Various circulators can be positioned at different locations within housing 105 at different or the same angles as compared to baskets 107a-107n, and can operate based on whether one or more baskets is currently in use.

Housing 105 can also include one or more light 108. Light 108 can be one or more light emitting diode (LED), if desired, and/or any other type of light (e.g., UV light, laser, etc.). Light 108 can emit light of any desired frequency including light of the visible spectrum and/or light of the invisible spectrum. Light 108 can provide ambiance, an esthetic light show, and/or function as a night light. Light 108 can provide visible light to assist a user's ability to see inside and/or outside housing 105. Light 108 can be used to communicate information, including a cleansing cycle's progress, timing, and/or completeness, a cleansing solution's level, a storage tank's fullness, a basket's state and/or use, a circulator's state and/or functionality. Light 108 can provide heat, for example, to heat cleansing solution while a cleansing cycle is in progress and/or to sanitize the cleansing device 100 during a self-cleansing cycle, after an item's cleansing cycle is complete. Further, light 108 can be used as a heating source to expedite evaporation, at times (e.g., when housing 105 is being stored in a dry state). Light 108 can provide scavenging, sterilization (e.g., via UV rays which kill microbes and keep air sterile), and the like. Light 108 can be controlled by control processor 115, via user input, and/or preprogramed processes.

Housing 105 can include one or more heating unit 109. Heating unit 109 can be a heat plate, one or more resistors, conducting surface, and/or the like, that produces heat. Heating unit 109 can be controlled by control processor 115 according to one or more cleansing cycles, self-cleansing cycles, and/or the like. Heating unit 109 can function according to preprogrammed heating cycles, one or more measured thresholds (as is described herein), and/or according to user input. Heat unit 109 can provide heat, for example, to heat cleansing solution while an item is being cleansed and/or to sanitize the housing itself during a self-cleansing cycle. Further, heat unit 109 can be used as a heating source to expedite evaporation at times (e.g., when housing 105 is being stored in a dry state). Heat unit 109 can provide scavenging, sterilization, and the like. Heat unit 109 can be controlled by control processor 115, via user input, and/or preprogramed processes.

Housing 105 can include one or more vibrator 110. Vibrator 110 can be controlled by control processor 115 to vibrate at one or more frequencies, for one or more cleansing cycles, for one or more amounts of times. For example, vibrator 110 can vibrate at ultrasound frequencies (e.g., about 20-400 kHz). Other example frequencies that can be used are infrasonic, sonic, hypersonic, and go up to and beyond $10^{20}$ Hz. Vibrator 110 can be utilized as part of one or more cleansing cycles, one or more self-cleansing cycles, and to expedite evaporation at times (e.g., when housing 105 is being stored in a dry state). Vibrator 110 can be controlled by control processor 115, via user input, and/or preprogramed processes.

Housing 105 can include a one or more testing and/or diagnostic sensors 132 therein, that receive input (data) from before, during, and/or after a cleansing cycle, self-cleansing cycle, and/or storing mode. The data can be communicated to control processor 115 and/or stored in memory 118. Control processor 115 can run analytics on the collected data and store the analytics in memory 118. Control processor 115 can display a graphics user interface (GUI) via output 117, which can be an LED screen and/or touch screen. Control processor 115 can transmit the analytics and/or the raw data from sensors 131a-131n to a central computing device (e.g., server, computer, laptop, smart watch, smart phone, tablet, and/or the like), as is described further below with reference to FIGS. 3-4.

Any combination of none, one, or more circulators 106a-106n, none, one, or more baskets 107a-107n, none, one, or more lights 108, none, one, or more heat units 109, none, one, or more vibrators 110, and/or the like can operate alone and/or in combination with each other and can be controlled manually and/or automatically via user input 116, via control processor 115, via one or more program stored in non-transitory memory 118, via input received by transceiver 119, and/or based at least partly on information determined by sensor 132.

Data from any portion of one or more circulators 106a-106n, one or more baskets 107a-107n, one or more lights 108, one or more heat units 109, one or more vibrators 110, and/or the cleansing solution (used and/or unused) can be used for testing and diagnostic purposes. The testing and diagnostic purposes can test and/or assist in a diagnoses of one or more users of cleansing device 100 and/or be used in case studies involving a statistically significant number of subjects. One or more circulators 106a-106n, one or more baskets 107a-107n, one or more lights 108, one or more heat units 109, and/or one or more vibrators 110 can include testing and diagnostic sensors therein, that receive input (data) before, during and/or after a cleansing cycle, self-cleansing cycle, and/or storage mode. The data can be communicated to control processor 115 and/or stored in memory 118. Control processor can run analytics on the collected data and store the analytics in memory 118. Control processor 115 can display a graphics user interface (GUI) on output 117, which can be an LED screen and/or touch screen. Control processor 115 can transmit the analytics and/or the raw data from cleansing device 100 to a central computing device (e.g., server, computer, laptop, smart watch, smart phone, tablet, and/or the like) as will be explained in more detail below with reference to FIGS. 3-4.

In some aspects, collected data can indicate that one or more component parts within housing 105 is in error, malfunctioning, needs replacements, needs servicing, cleansing, and/or the like. Such information can be conveyed on the GUI, and the GUI can provide a user with the ability to order the suggested component using a touch screen of input/output 116/117. A user can have an online account having profile information including payment information, shipping information, preferences, health insurance information, and/or the like stored therein. With one or more clicks, a user can order additional products as is suggested in the GUI based on data collected from the testing and diagnostic sensors of the device and/or any component thereof. Additionally, and/or alternatively, a service provider can automatically send additional products as is determined by the service provider based on data collected without a user having to proactively order the products. The service provider automatically sending products to the user can utilize information in their profile to charge the user and/or their insurance company for the products.

Diagnostic information can also be conveyed to a central location to identify common component part defects, such that future devices can be improved and/or recalls can be effectively administered (e.g., FDA (federal drug administration) recalls). Further, maintenance information and/or installation instructions can be communicated to the user via their smart phone and/or the GUI to help a user service their cleansing device 100. Additionally, and/or alternatively, information from the collected data can trigger a service call with a service provider. For example, a user can be prompted to schedule a service call and/or a service provider can be prompted to initiate a service appointment with the user. The GUI can provide a list of service providers based on information from the collected data, such that the list of service providers is prioritized, ordered, and/or limited to service providers offering services related to the determined issue needing servicing. For example, a service call can send a person to a user's home to handle a repair issue, installation issue, and/or cleansing issue. In another example, a service call can involve a health issue, wherein diagnostic information collected from the testing and diagnostic sensors is used to diagnose or flag a potential diagnoses of a medical condition of the user (e.g., an eye infection). The list of service providers can be medical care providers, and/or a medical care provider can be prompted to initiate contact with the user, for example, via a phone call, via the GUI, or in a next scheduled doctor's visit.

The testing and diagnostic sensors can collect information useful in detecting ailments of the eye (e.g., conjunctivitis, blepharitis, keratitis, malnutrition, and/or the like) and/or other ailments of the user (e.g., diabetes, autoimmune disorders, and/or other ailments). Any information collected from the device can be stored in memory 118 and analyzed via control processor 115 and/or transmitted to a remote location for storage and/or analytics. Raw data and/or analyzed data related to ailments can be communicated with one or more doctors who can make recommendations and/or schedule a doctor's appointment based at least on the data collected by testing and diagnostic sensors of the device. Further, collected information can be sent to an insurance company. The insurance company can use the data to confirm and/or validate medical claims, medical codes, treatments, diagnoses, medication, and/or otherwise prevent fraudulent activity of a user or a medical service provider. The validation process can be performed prior to dispensing funds and/or products. The validation process can be performed after dispensing funds and/or products. Further, the insurance company can use the data to determine the effects of the device, particular cleansing solutions, and/or other substances dispensed by the device (e.g., tablets, medications, etc.) and/or to track trends of a user and/or a statically significant number of subjects.

Housing 105 can include one or more valve 111, which releases cleansing solution from one or more portions of housing 105 into one or more drain line 112. During a cleansing cycle and/or storing mode, the cleansing solution that was used during the cleansing cycle has converted from being fresh, unused cleansing solution to being used cleansing solution. Upon completion of a cleansing cycle and/or storage mode, cleansing device 100 can operate to drain the then used cleansing solution from baskets 107a-107n. One or more drain line 112 can couple to one or more valve 113 that actuates to release used cleansing solution through one or more drain line 112 into a disposal site (e.g., a sink, a plant, and/or the like). Cleansing device 100 can include a used solution storage 114. One or more valve 113 can actuate to release cleansing solution from drain line 112 into a used solution storage 114.

Used solution storage 114 can store any used liquid, solution, particulates, and/or the like. For example, used solution storage 114 can store contact solution after it has been used to cleans contact lenses. Used solution storage 114 can have a cap, lid, door, drawer, drain, and/or the like that a user removes thereby allowing the used cleansing solution therein to empty out of the used solution storage 114. Used solution storage 114 can have a sponge therein, which is discarded by the user upon saturation. Used solution storage 114 can have an output channel that allows used cleansing solution to drain out used solution storage 114 into a disposal site (e.g., into a sink, into a plant, into a trash can, into a biohazard receptacle, onto the ground, and/or the like). In some aspects, used solution from used solution storage 114 can be collected and used for testing and diagnostic purposes. The testing and diagnostic purposes can test and diagnose one or more users of cleansing device 100 and/or be used in case studies involving a statistically significant number of subjects. Used solution storage 114 can include testing and diagnostic sensors therein, the receive input (data) from the solution in the used solution storage 114. The data can be communicated to control processor 115 and/or stored in memory 118. Control processor 115 can run analytics on the collected data and store the analytics in memory 118. Control processor 115 can display a graphics user interface on output 117, which can be an LED screen and/or touch screen. Control processor 115 can transmit the analytics and/or the raw data from used solution storage 114 to a central computing device (e.g., server, computer, laptop, smart watch, smart phone, tablet, and/or the like) as is described further below regarding FIGS. 3-4.

Figure 2A:
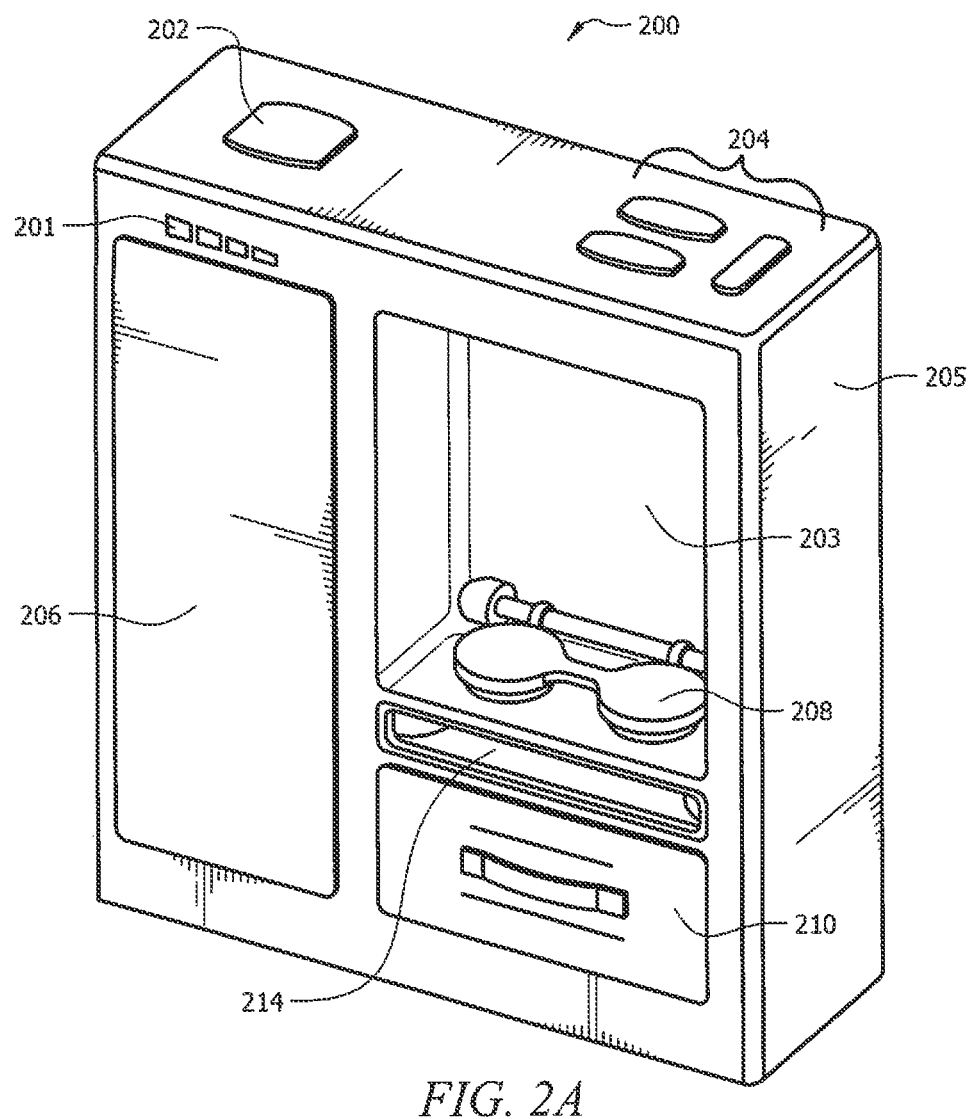
FIG. 2A shows aspects of an exemplary implementation of a cleansing device as disclosed herein.

FIGS. 2A-2G show exemplary implementations of contact lens cleansing device 200. FIG. 2A shows an example implementation of contact lens cleansing device 200 as can be seen from a user viewing it on a counter, table, and/or the like. Contact lens cleansing device 200 can be a handheld cleansing device, made of light weight material, and can easily be placed and/or stored on a bathroom countertop, transported in a suitcase and/or bag, and purchased over the counter and/or shipped in a relatively small and light shipping box.

Cleansing device 200 can include housing 205, within which door 206, drawer 210, and lid 208 connect. Housing 205 can include user output 201, which can be one or more LED lights of any and/or changing colors. User inputs 202 and 204 (e.g., buttons, switches, plungers, etc.) can receive input from a user. Housing 205 can include cavity 203. Cavity 203 can provide access to lid 208. In some aspects, an LED screen, touchscreen, and/or other type of display screen (e.g., a flexible screen, a MEMS screen Micro-Electro-Mechanical-System, and/or the like) can be located within cavity 203. Housing 205 can house cleansing reservoir 214, within which contacts can be cleansed.

Figure 2B:
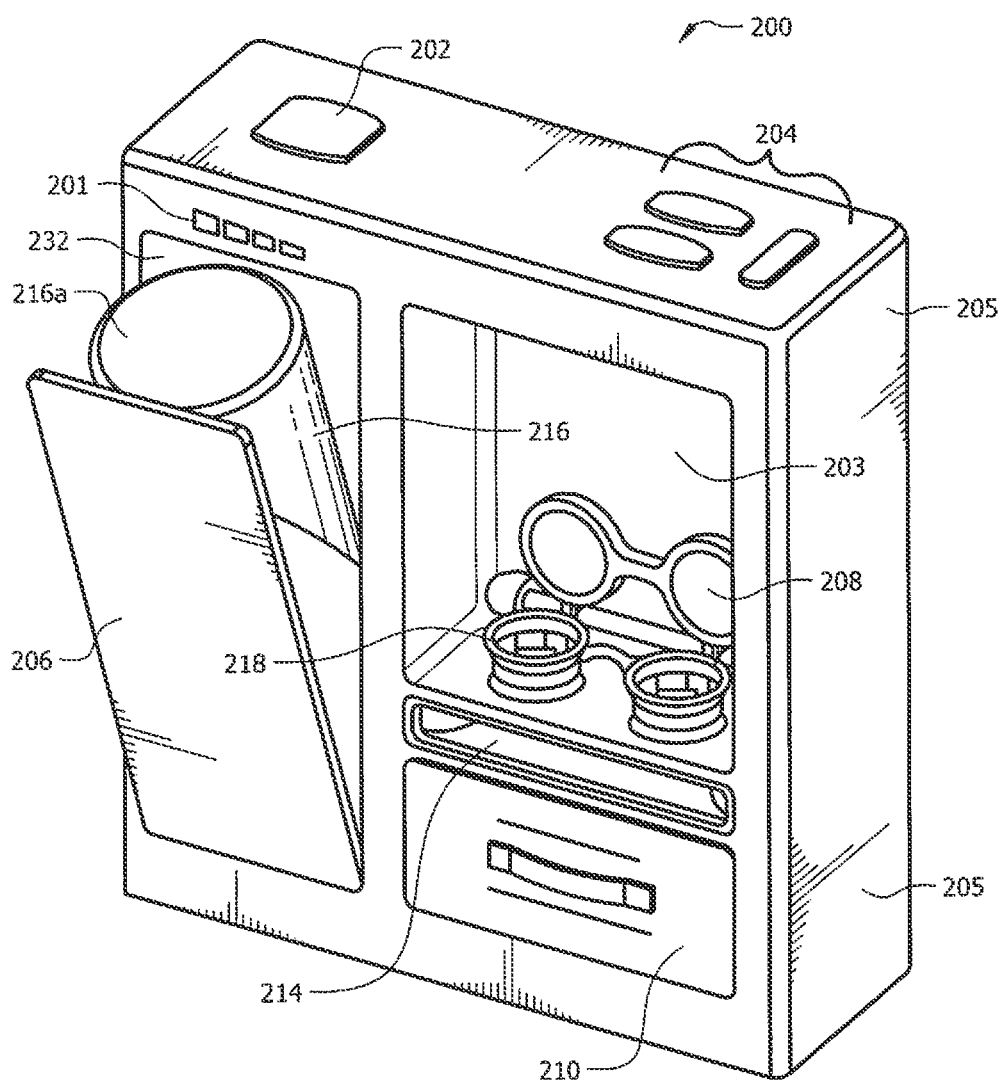
FIG. 2B shows other aspects of an exemplary implementation of a cleansing device as disclosed herein.

FIG. 2B shows an example of cleansing device 200, wherein some of the internal components are in view. Door 206 is shown in an open (e.g., partial open) position. Behind door 206 is cavity 232, within which is stored cartridge 216. Cartridge 216 is a vessel that stores unused, fresh contact solution. Cartridge 216 can be made of light weight plastic and/or any waterproof disposable material. In some aspects, cartridge 216 can include a depressible portion 216a, which can be depressed as a plunger in order to controllably force contents stored therein to exit an opposing portion of cartridge 216. Cartridge 216 seats into cavity 232 and is supported, at least partially, by pivoting door 206.

Lid 208 is shown in an example open position. Baskets 218 are shown raised out of cleansing reservoir 214. Contacts (and/or any item desiring of cleansing) can be placed within baskets 218, for example, one contact per basket. Lid 208 can be closed over baskets 218, securing the contacts therein. Baskets 218, can lower into cleansing reservoir 214. Cleansing reservoir 214 can have transparent, translucent, and/or opaque portions thereof. For example, cleansing reservoir 214 can have a transparent front window allowing a user to see contents therein and a cleansing cycle in process. Further, one or more light can be viewed through a front window if desired (e.g., ambient light, communication light, light show, night light, etc.). Further, one or more of the lights can be part of the cleansing cycle and assist in the cleansing process as is described above.

Figure 2F:
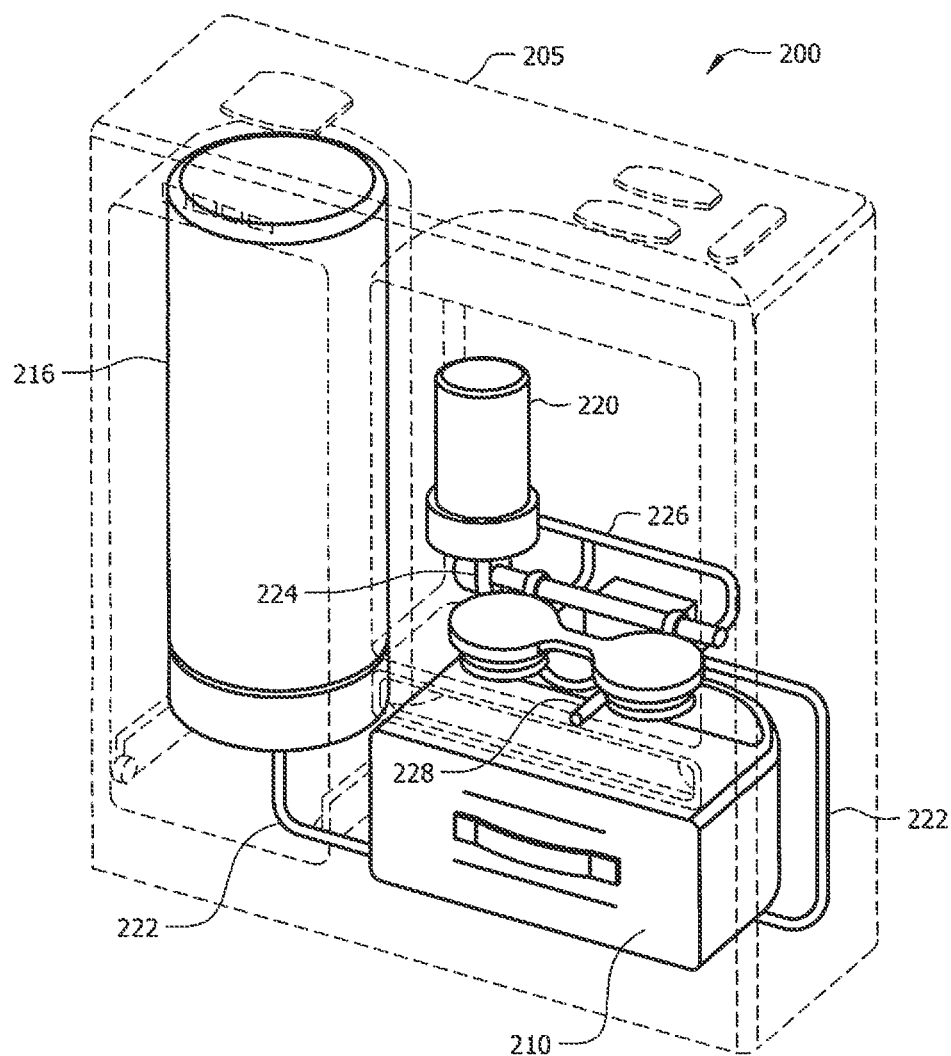
FIG. 2F shows other aspects of an exemplary implementation of a cleansing device as disclosed herein.

FIGS. 2C-2F show example components that can be located within housing 205 of cleansing device 200. In FIGS. 2C-2E, housing 205 is not shown. FIG. 2C shows an example front view; FIG. 2D shows an example top-down view; and FIG. 2E shows an example side view. FIG. 2F shows an example angled view, wherein a silhouette of housing 205 is shown.

Referring to FIGS. 2C-2F jointly, cartridge 216 is seated within mounting mechanism 230 (e.g., saddle, cradle, coupler, repository, and/or the like). In some aspects, cartridge 216 can have a male configuration and mounting mechanism can have a female configuration, such that, cartridge 216 mounts into mounting mechanism 230. In some aspects, the coupling configuration can have threads such that cartridge 216 screws into mounting mechanism 230; the couple configuration can have tabs, flanges (and/or the like), such that cartridge 216 snaps into mounting mechanism 230; the coupling configuration can utilize gravity such that cartridge 216 simply rests in mounting mechanism 230; and/or the like. Mounting mechanism 230 can include a piercing member (not shown), such that as cartridge 216 is mounted into mounting mechanism 230, piercing member pierces a sealed cover of cartridge 216 wherein allowing the contents of cartridge 216 to exit therefrom in a controlled manner. Prior to the piercing of the sealed cover, the sealed cover can prevent the contents of cartridge 216 from becoming contaminated and provide a visual indicator to a user regarding whether the cartridge has been tampered with and/or previously used.

Coupled to mounting mechanism is line 222 (e.g., hose, pipe, duct, channel, and/or the like), which can be flexible, rigid, and/or anywhere in between. Line 222 allows solution to travel from cartridge 216 to cleansing reservoir 214. Solution can enter line 222 in a controlled manner via one or more cartridge exiting mechanisms. In some aspects, depressible portion 216a can be depressed and plunge downward forcing solution to exit cartridge 216 into line 222. The exiting solution's timing, speed, and amount, can be controlled by the force with which depressible portion 216a is depressed. In some aspects, mounting mechanism 230 can include a valve 102a, which controls the timing, speed, and amount of solution exiting cartridge 216. In some aspects, housing 205 can include a pump, which controls the timing, speed, and amount of solution exiting cartridge 216. Implementations can include one, some, or all of the above cartridge exiting mechanisms, and implementations can include additional cartridge exiting mechanisms. The cartridge exiting mechanisms can be controlled manually and/or by one or more control processor (e.g., control processor 115). In some aspects, a user can depress a button (e.g., button 202), which presses against depressible portion 216a, controlling and/or partially controlling the timing, speed, and amount of solution exiting cartridge 216. In other aspects, a user can provide input to cleansing device 200 (e.g., button 202, 204, a touch screen button on a touch screen in cavity 203, providing input via a cell phone, and/or the like), and control processor 115 can control some or all cartridge exiting mechanisms in order to control the timing, speed, and amount of solution exiting cartridge 216.

Solution enters line 222 and travels toward cleansing reservoir 214. For example, circulator 220 can draw solution from cartridge 216 inputting the solution into the cleansing reservoir 214. In some aspects, valve 104a can be positioned at the junction of line 222 and cleansing reservoir 214. Valve 104a can control the timing, speed, and amount of solution that enters cleansing reservoir 214. Implementations can omit a value at the junction of line 222 and cleansing reservoir 214 and allow solution to freely flow from line 222 into cleansing reservoir 214. Solution can fill cleansing reservoir 214 fully, partially, and/or to a predetermined level. Cleansing reservoir 214 is coupled to one or more circulation lines 224 and 226 that are also coupled to circulator 220. In some aspects, circulator 220 uses circulation lines 224 and 226, and/or additional lines, to circulate solution through cleansing reservoir 214. FIG. 2C shows an example of circulator line 226, wherein circulator line 226 has a split that forces solution into a first basket and forces solution into a second basket.

Control processor 115 can control circulator 220 to control the timing, speed, and amount of solution forced through one or more of circulation lines 224 and 226. The timing, speed, and amount of solution forced through one circulation line can be the same and/or different from another of the circulation line. Circulator 220 can operate to change the timing, speed, and amount of solution forced through some aspects or more of circulation lines 224 and 226 according to one or more cleansing cycles. In some aspects, a cleansing cycle can circulate solution at a constant rate for a threshold amount of circulation time, upon which the process is complete. In some aspects, a cleansing series and/or cleansing cycle can be preprogramed (and/or received programming for example via transceiver 119), stored in memory 118, and executed by control processor 115. In some aspects, a cleansing cycle can vary the timing, speed, and amount of solution forced through one or more of circulation lines 224 and 226 based on parameters. Cleansing cycles can include a plurality of sequential steps performed according to a cycle that is stored in memory 118. Various steps can include solution circulation, air circulation, soaking, heating, lighting, vibrating, and/or the like. The steps can be performed in any order, for any length of time, at any intensity, and in combination with each other, as is designated by a cycle program stored in memory 118. Further control processor 115 can alter a stored cycle program based on parameters, as are described below, such that one or more step is performed a different number of times, in a different order, for a different length of time, at a different intensity, and/or according to a different combination as compared to the cycle program stored in memory 118.

Various parameters can include a user selection, a measured level of contamination, litmus tests conducted during the cleansing cycle, a determined level of dirtiness, a determined level of proteins and/or pollutants, a determined amount of time since the last cleansing of the item (e.g. contacts), a determined time, day, and/or week. In some aspects, a cleansing series can involve multiple cleansing cycles that are prescribed to be carried out over a period of time. For example, a cleansing series can be thirty days long, wherein over a thirty day period thirty cleansing cycles are intended to be performed. A multiple cleansing cycle cleansing series can vary the cleansing cycles as time progresses and/or as the number of cleansing cycles progress. For example, the timing, speed, and amount of solution forced through one or more of circulation lines 226 can be different in the first cleansing cycle of the cleansing series as compared to the second cleansing cycle of the cleansing series as compared to the nth cleansing cycle of the cleansing series. In some aspects, with each cleansing of a contact lens, the cleansing cycles can become longer and/or more aggressive than before; with each cleansing of a contract lens, the cleansing cycles can become longer and/or less aggressive than before; and/or any combination thereof. In some aspects, a cleansing series can utilize a different solution every nth cleansing cycle (e.g., every 5th cleansing cycle) to provide a deeper cleansing according to a preset schedule. In some aspects, a cleansing series can utilize a different solution when a certain bacteria detected, when a threshold level of contamination is detected, and/or when a certain litmus test result occurs. In some aspects, one or more sensors 131, 132, and the like can assist in determining various parameters.

Cleansing cycles and/or cleansing series can be monitored and data and/or results thereof recorded in memory 118. Data and/or results can be viewed by a user and/or transmitted to a central facility such that a centralized administrator can monitor the results. In light of information received via transceiver 119, an administrator (e.g., doctor) can send new cleansing cycles and/or cleansing series to cleansing device 200 and/or otherwise change a cleansing cycle and/or cleansing series via programming loaded into cleansing device 200.

In an example cleansing cycle, cleansing device 200 locks locking mechanism 121 and draws cleansing solution from cartridge 216 into cleansing reservoir 214 until a threshold amount of cleansing solution has been drawn. Next, circulator 220 circulates the cleansing solution for a threshold amount of circulating time. Then, circulator 220 ceases circulation and the contacts soak in the cleansing solution for a threshold amount of soaking time. In some aspects, additional steps can be included and/or some steps can be omitted. At the conclusion of this example cleansing cycle, cleansing device 200 unlocks locking mechanism 121. Upon completion of a cleansing cycle, an indicator can provide an indication to the user that the cleansing cycle is complete. In some aspects, an LED can turn on, change color, and/or otherwise provide an indication. Additionally and/or alternatively, a sound can provide an indication. In some aspects, the cessation of one or more circulators can cause the absence of sound or vibrations that can provide an indication. Further, a locking mechanism unlocking can be an indication. Further, a message can be sent to a user's communications device (e.g., smart phone) thereby providing an indication. One or more indication can be provided as is desired. A user can input a selection indicating which indication they prefer.

Upon completion of a cleansing cycle, cleansing reservoir 214 can enter a storing mode. In storing mode, cleansing reservoir 214 stores the items therein. During storing mode, some, none, or a portion of solution can exit cleansing reservoir 214 via drain line 228. In some aspects, a predetermined amount of solution remains within cleansing reservoir 214 to maintain a desired moisture level of the item being stored therein. For example, if cleansing device 200 completed a contact cleansing cycle, during storing mode, a threshold level of solution remains in cleansing reservoir 214 to maintain the contact's moisture. When a user is ready to retrieve the item from baskets 218, if any solution is remaining in cleansing reservoir 214, the solution can drain via drain line 228 at that time. In another example, if cleansing device 200 completed a self-cleansing cycle, then in storing mode, cleansing reservoir 214 can drain all the solution via drain line 228, and actively or passively allow cleansing device 200 to dry (e.g., via circulating air, using light, using heat, and/or using vibrations).

Figure 2G:
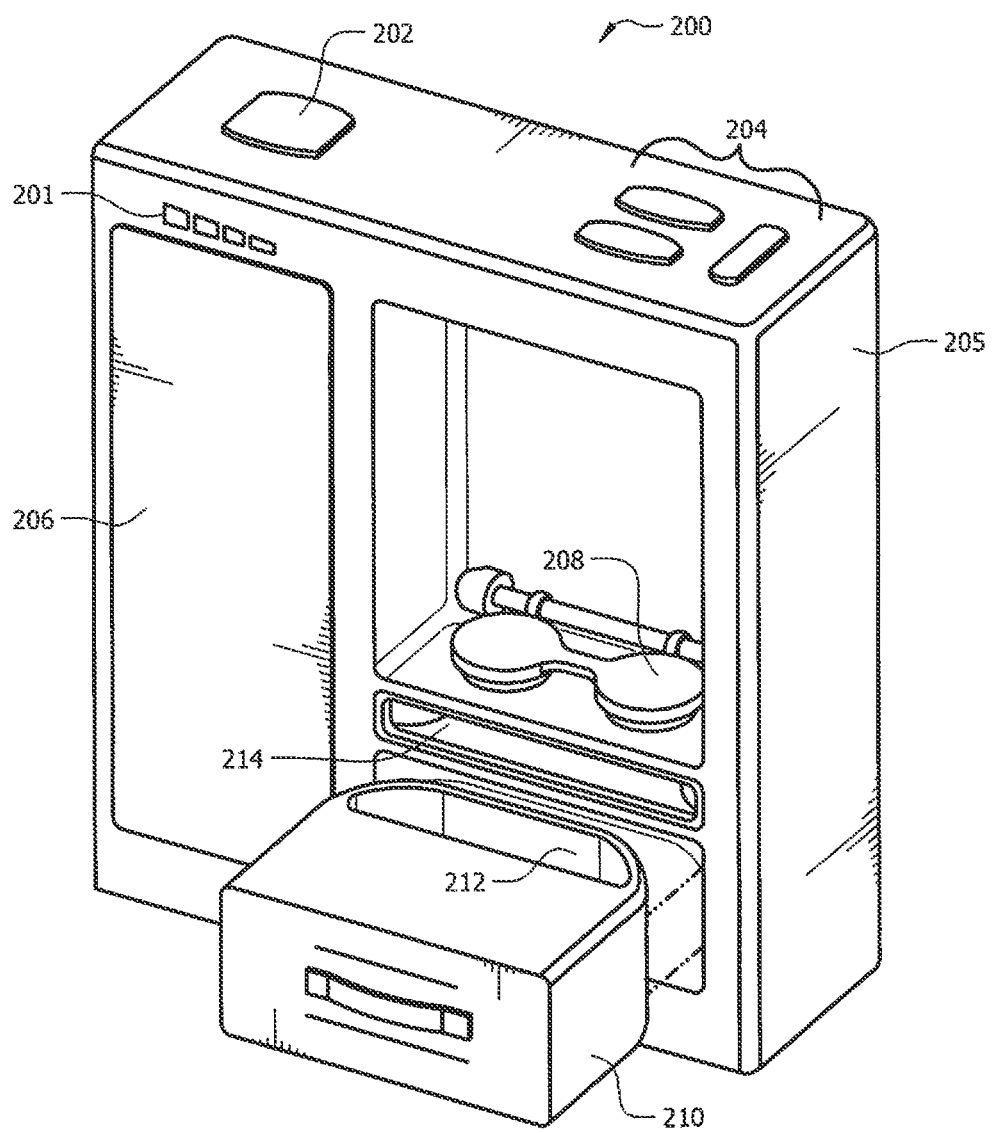
FIG. 2G shows other aspects of an exemplary implementation of a cleansing device as disclosed herein.

FIG. 2G illustrates an example of cleansing device 200 that shows additional internal components. Drawer 210 is illustrated in an open position showing used solution storage 212 therein. Drain line 228 outputs solution into used solution storage 212. In some aspects, used solution storage 212 is a cavity of drawer 210, and a user can remove drawer 210 and pour out the used solution, for example, by pouring the used solution down a sink. In some aspects, a user can pour the used solution into a container and deliver the used solution to a facility (e.g., medical office) for testing.

Figure 3:
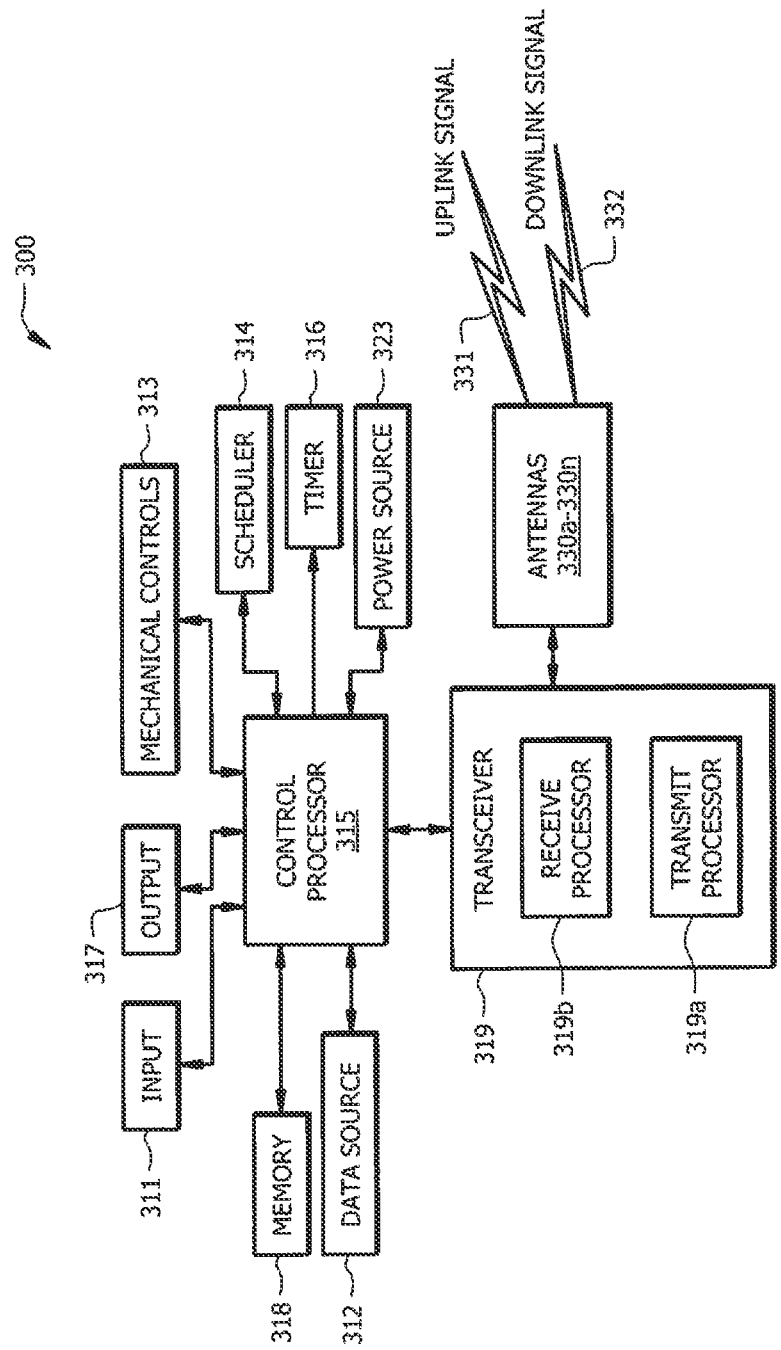
FIG. 3 illustrates a block diagram of an exemplary implementation of a circuitry system, which can be included within implementations of cleansing devices as disclosed herein.

FIG. 3 shows a block diagram of an example circuitry system of cleansing device 300. Control processor 315 and/or other processors and modules can perform or direct the execution of various processes and techniques described herein. One or more memory 318 can be a non-transitory storage of data and program code for cleansing device 300, which can be executed to perform techniques described herein. Scheduler 314 can schedule and track herein described processes, cleansing cycles, maintenance, communications, and/or the like. Timer 316 can function in conjunction with scheduler 314 to perform herein described processes, cleansing cycles, maintenance, communications, and/or the like.

Control processor 315 can perform processes using one or more electrical, mechanical, magnetic, etc. controls 313 (e.g., locks, drawers, doors, valves, etc.) in response to instructions provided by scheduler 314, timer 316, and/or memory 318. Control processor 315 can receive user input from input 311, which can be a switch, button, toggle, and/or the like. Further, input 311 can be a local and/or remote touch screen (e.g., a smart phone). Control processor 315 can output user information/data to output 317, which can be one or more of a microphone, light, switch, aroma generator, vibrator, flavor provider, and/or the like. Further, output 137 can be a screen (e.g., LED screen) that conveys information and can combine with input 136 (e.g., depressible light/button, tactile switch, remote and/or local touch screen, etc.). Further, cleansing device 300 includes one or more power source 323. Power source 323 can be one or more AC, DC, USB cable, and/or the like that connects to a power socket. Power source 323 can be one or more batteries (e.g., rechargeable battery, lithium battery, and/or the like). Further, power source 323 can include solar power and/or charge wirelessly (e.g., via capacitor technology).

Cleansing device 300 can include transceiver 319 comprising one or more transmit processor 319a that can receive data from data source 312 and control information from control processor 315. Transmit processor 319a can transmit via multiple-input multiple-output (MIMO), multiple-input single-output (MISO), single-input single-output (SISO), single-input multiple-output (SIMO), and/or the like using one or more antennas 330a-330n. Transmit processor 319a can perform processing (e.g., convert to analog, amplify, filter, and upconvert) on a signal prior to transmission. Uplink signals 331 can be uplink transmitted via antennas 330a-330n.

Antennas 330a-330n can receive the downlink signals 332 from a wireless communication system (e.g., base station, femto cell, relay, peer to peer, smart phone, etc.). Receive processor 319b can condition (e.g., filter, amplify, downconvert, and digitize) a respective received signal to obtain data, software updates, and/or other information. Receiver processor 319b can receive via multiple-input multiple-output (MIMO), multiple-input single-output (MISO), single-input single-output (SISO), single-input multiple-output (SIMO), and/or the like. Receive processor 319b can process (e.g., demodulate, deinterleave, and decode) the detected a signal and provide decoded data for cleansing device 300 to memory 318 and/or provide decoded control information to control processor 315.

Figure 4:
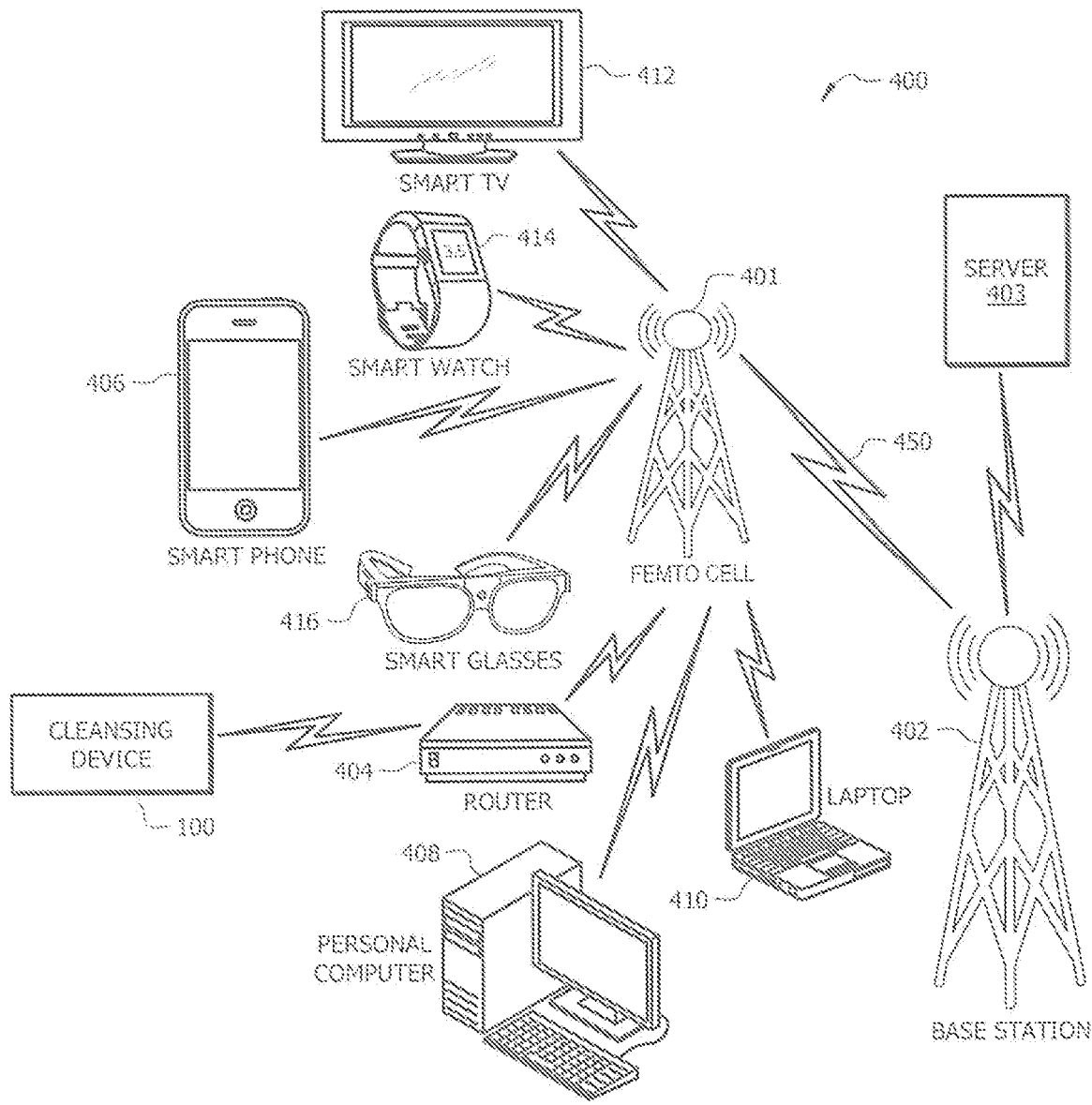
FIG. 4 is block diagram of an exemplary implementation of a network within which a cleansing device as disclosed herein can communicate.

FIG. 4 shows wireless network 400 for communication according to some one or more aspects. While discussion of the technology of this disclosure is provided relative to wireless communications, wired communications can supplement and/or replace the wireless communications. Wireless communications can include the Internet of Things (IoT), long term evolution (LTE), LTE-A, third generation (3G), fourth generation (4G), fifth generation (5G), and/or other network deployments. Components of FIG. 4 can include cellular-style network arrangements and non-cellular-style-network arrangements (e.g., device-to-device, peer-to-peer, or ad hoc network arrangements, etc.).

Wireless network 400 includes a number of base stations 402, such as can comprise evolved node Bs (eNBs) or G node Bs (gNBs). A base station 402 can provide communication coverage for a macro cell or a small cell, such as a pico cell or a femto cell 401, and/or other types of cell. A macro cell generally covers a relatively large geographic area (e.g., several kilometers in radius) and can allow unrestricted access by wireless devices with service subscriptions with the network provider (e.g. smart phone 406). A small cell, such as a femto cell 401, would generally cover a relatively small geographic area (e.g., a home) and, in addition to unrestricted access, can also provide restricted access by wireless devices (e.g., smart TV 412, laptop 410, personal computer 408, and the like) having an association with the femto cell 401 (e.g., wireless devices in a closed subscriber group (CSG), devices for users in the home, and the like).

Wireless devices are dispersed throughout wireless network 400, and each wireless device can be stationary or mobile. Some non-limiting examples of wireless devices include a router 404, a cellular (cell) phone, a smart phone 406, a session initiation protocol (SIP) phone, a laptop 410, a personal computer (PC) 408, a notebook, a netbook, a smart book, a tablet, and a personal digital assistant (PDA), a smart watch 414, smart glasses 416 and/or the like. A mobile apparatus can additionally be an IoT device such as intelligent lighting, a home security system, a smart meter, a smart TV 412, a smart appliance, a smart cleansing device 100, etc. A wireless device, such as cleansing device 100, can be able to communicate with macro base stations, pico base stations, femto cells, routers, relays, and the like. In FIG. 4, a lightning bolt (e.g., communications link 450) indicates wireless transmissions between systems on the downlink and/or uplink. Networks include one or more backhaul servers, which communicate with base stations and provide network side services.

Cleansing device 100 can communicate in a wireless network, for example, wireless network 400 to send and receive data from a centralized location (e.g., server 403). As described above, cleansing device 100 can collect raw data and/or analytics and send the raw data and/or analytics to another device including but not limited to smart phone 406, smart TV 412, smart watch 414, smart glasses 416, personal computer 408, laptop 410, and or the like. Further, cleansing device 100 can collect raw data and/or analytics and send the raw data and/or analytics to a centralized server that collects data from multiple cleansing devices 100 across a distributed network. Various data and/or analytics can be used to study users of one or more users of a particular cleansing device 100. Additionally and/or alternatively, various data and/or analytics can be used to study users of a plurality of cleansing devices 100 for the purposes of research, which can include statistically significant subject samples. Studies can be used to alter particular cleansing cycles and/or cleansing series for a user of a cleansing device. Studies can be used for diagnosis of machinery defects and/or one or more patient's health. Data can be used for marketing, advertising, to sell replacements parts, additional cartridges, implement recalls, and/or the like.

Figure 5:
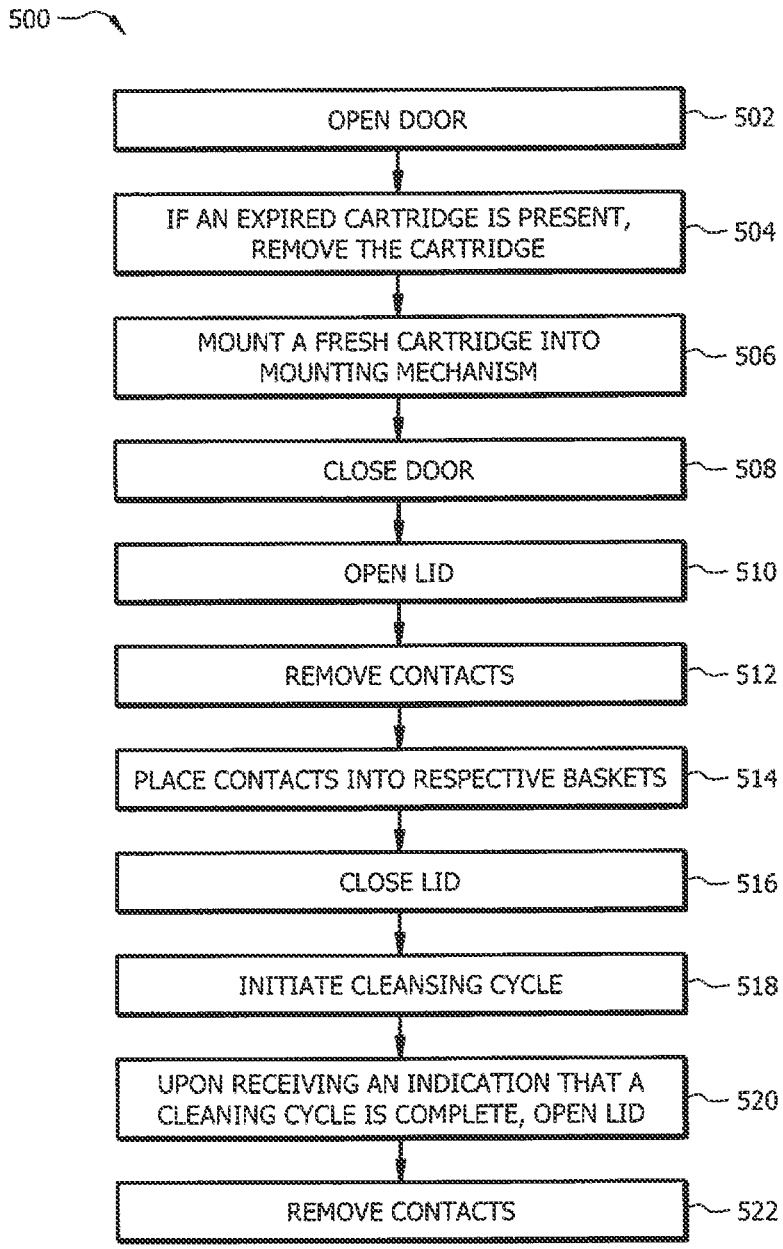
FIG. 5 shows aspects of an exemplary method involving systems and devices disclosed herein.

FIG. 5 illustrates an example method 500 of using the devices disclosed herein. Please note that some of the steps can be omitted from time to time and can be done in a different order from time to time. At step 502, a user opens the door. In step 504, if an expired cartridge is present, a user removes the expired cartridge, and at step 506, the user mounts a fresh cartridge into the mounting mechanism. At step 508, the user closes door. At step 510, a user can open the lid. At step 512, a user can remove contacts (or other item being cleansed). At step 514, a user can place the contacts (or other item) into respective baskets. At step 516, a user can close the lid. At step 518, a user can initiate a cleansing cycle (e.g., press a start button). Upon receiving an indication that a cleansing cycle is complete, at step 520, a user can open the lid. At step 522, a user can remove the contacts (or other item) from the baskets. After example method 500 is complete, the cleansing device 100 can initiate a self-cleansing cycle.

Figure 6:
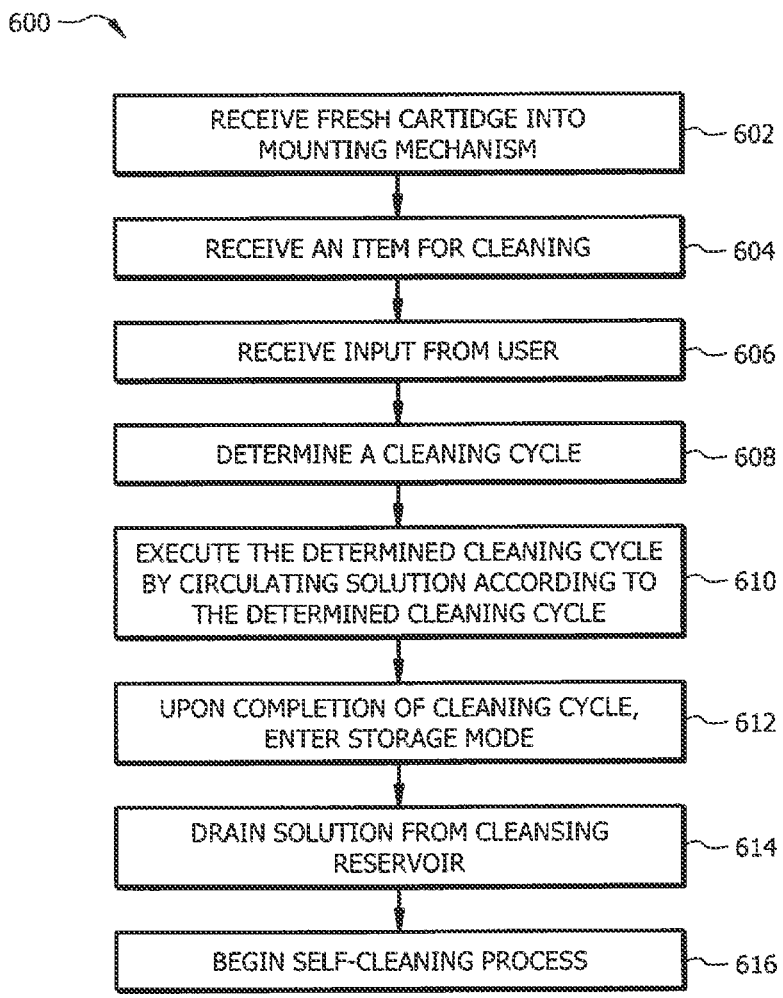
FIG. 6 shows aspects of another exemplary method involving systems and devices disclosed herein.

FIG. 6 illustrates an example method 600 that a cleansing device, as described herein, can execute. Please note that some of the steps can be omitted from time to time and can be done in a different order from time to time. At step 602, a cleansing device receives a fresh cartridge into mounting mechanism. At step 604, the cleansing device receives an item for cleansing. At step 606, the cleansing device receives input from a user indicating that a cleansing cycle is desired. At step 608, the cleansing device determines which cleansing cycle to perform. At step 610, the cleansing device executes the determined cleansing cycle by circulating solution according to the determined cleansing cycle's schedule. In some aspects, a cleansing cycle can include any combination of period of circulation, soaking, lighting, heating, vibrating, and/or the like. Upon completion of the cleansing cycle, at step 612, the cleansing device enters storage mode. At step 614, the cleansing device drains solution from cleansing reservoir. After example method 600 is complete, the cleansing device can initiate self-cleansing cycle.

A self-cleansing cycle is a cycle wherein the cleansing device cleanses itself. Similar to that of a cleansing cycle and/or cleansing series, one or more self-cleansing cycles can be stored in memory 118 and can be performed based on parameters. Any of the parameters described above can be used when control processor 115 determines which self-cleansing cycle to perform. Solution from cartridge 216, other solutions, heat, light, vibrations, circulation of air, and any other cleansing means described herein can be utilized as part of a self-cleansing cycle.

Figure 7:
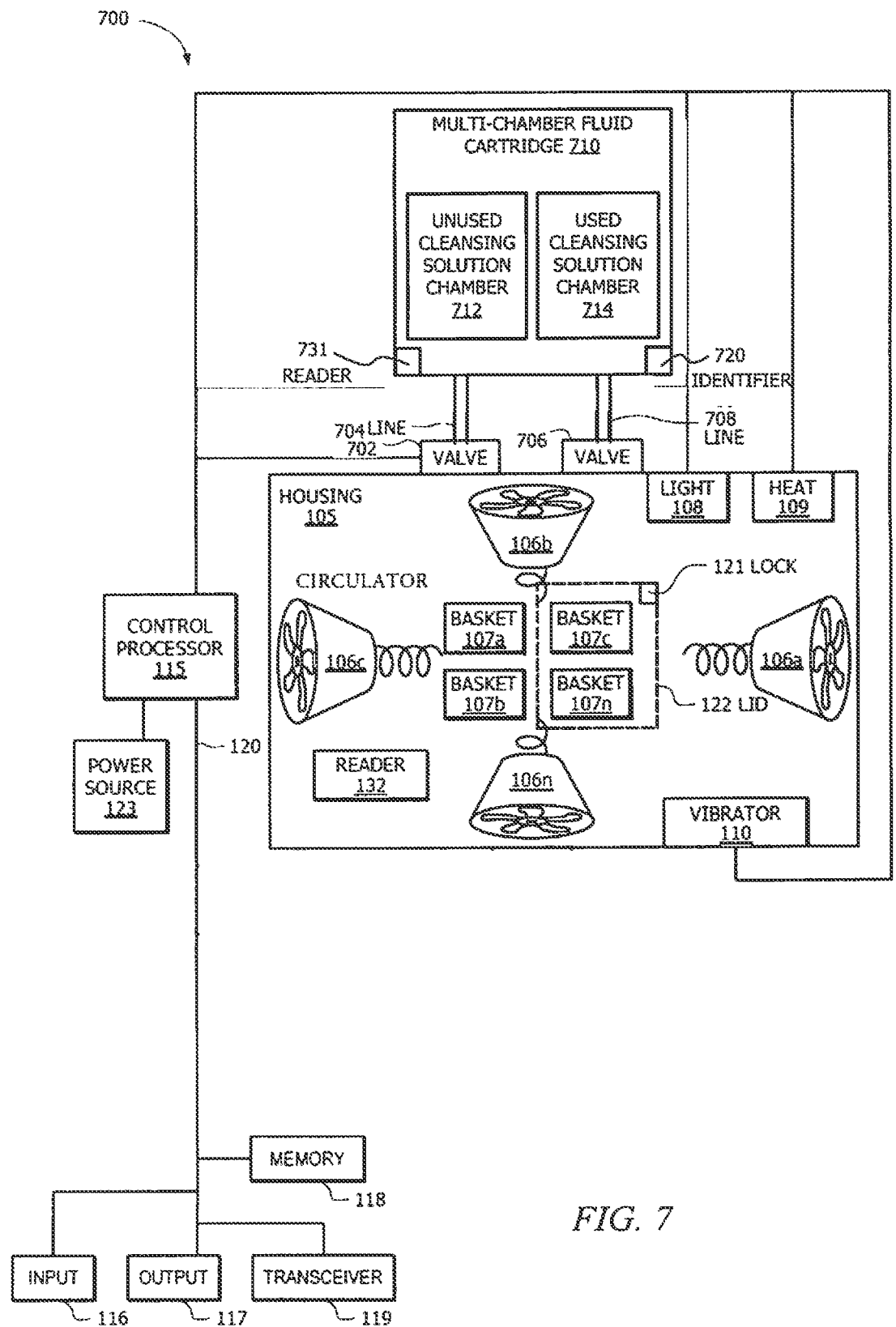
FIG. 7 is a block diagram of an example of a cleansing device and multi-chamber fluid cartridge according to one or more aspects disclosed herein.

FIG. 7 illustrates certain aspects of exemplary cleansing device 700. In preferred implementations, cleansing device 700 cleanses one or more contact lenses. However, cleansing device 700 can be used to clean and/or sterilize any number of objects, for example, toothbrush heads, makeup utensils, manicure and pedicure utensils, eye glasses, jewelry, baby supplies, facial brushes, hair brushes, skin brushes, kitchen utensils, medical devices and utensils, surgical utensils, and more. Cleansing device 700 includes housing 105, one or more circulators 106a-106n, one or more baskets 107a-107n, light 108, heating unit 109, vibrator 110, sensor 132, control processor 115, input 116, output 117, memory 118, transceiver 119, communication link 120, and power source 123, as described above with reference to FIG. 1. Cleansing device 700 also includes valve 702, fluid transfer line 704, valve 706, and fluid transfer line 708, which may include or correspond to valve 102a, line 103a, valve 111, and drain line 112, respectively, as described above with reference to FIG. 1.

To provide a source of unused cleansing solution and to provide a storage location for used cleansing solution, cleansing device 700 may be configured to receive (e.g., to reversibly mate with) multi-chamber fluid cartridge 710.

Multi-chamber fluid cartridge 710 may be configured to store multiple types of solutions, such as unused cleansing solution, (e.g., contact cleansing solution, brush cleansing solution, utensil cleansing solution, jewelry cleansing solution, and/or any type of cleansing solution) and used cleansing solutions (e.g., cleansing solution that has been circulated within cleansing device 700 for one or more cleansing cycles), as non-limiting examples, and to isolate the different types of solutions form one another. For example, multi-chamber fluid cartridge 710 may include unused cleansing solution chamber 712 (e.g., a first chamber) and used cleansing solution chamber 714 (e.g., a second chamber). Although described as two chambers, in some other implementations, multi-chamber fluid cartridge 710 may include more than one unused cleansing solution chambers and/or more than one used cleansing solution chambers. Unused cleansing solution chamber 712 may be physically isolated from used cleansing solution chamber 714. For example, chambers 712 and 714 may correspond to different cavities within a bladder, housing, or other structure within multi-chamber fluid cartridge 710, and the cavities may be separated by one or more sidewalls that are impermeable to the various solutions, such that solution stored in one chamber is unable to flow into any other chamber while stored in multi-chamber fluid cartridge 710. In addition to or in the alternative to storing unused (e.g., sterile) cleansing solution and used cleansing solution, one or more chambers of multi-chamber fluid cartridge 710 can store and/or dispense tablets, particles, powder, a mixture, and/or other items, solid or not, (e.g., enzyme tablets, neutralizing powder, gaseous mixture, etc.) that can automatically and controllably be released, according to a set schedule, on demand, and/or the like. Further, one or more chambers of multi-chamber fluid cartridge 710 can store a solution that cleanses contacts (or other objects), while one or more other chambers can store a solution that cleanses the cleansing device 700 itself. Further still, one or more chambers of multi-chamber fluid cartridge 710 can store and/or controllably dispense medication, prescription or otherwise, and/or other eye treatments. For example, one or more chambers of multi-chamber fluid cartridge 710 can store one or more of, and/or a mixture of, Azelastine, Bepotastine 1.5%, Cromolyn, Acular-Ketorolac Ophthalmic, Artificial Tears, Atropine Ophthalmic, Avastin for macular degeneration, Brimondine Ophthalmic (Alphagan), Ciloxan Ointment, Erythromycin Ointment, Gentamicin eye drops, Levobunolol Ophthalmic (Betagan), Lucentis, Macugen, Metipranolol (Optipranolol), Optivar, Patanol, PredForte Ophthalmic, Proparacaine, Timoptic, Trusopt, Visudyne (Verteporfin), Voltaren, Xalatan, allergy medication and/or treatments, antibiotic medication and/or treatments, vitamins, and/or the like.

Although described as a cartridge, in some other implementations, multi-chamber fluid cartridge 710 may be any type of multi-chamber, or otherwise segmented or divided, sterile storage container including, but not limited to: a syringe, a vessel, a bag, a bottle, a vial, a jar, a jug, a vacuum bottle, a cylinder, a tube, a capsule, a case, and/or any combination thereof, and/or the like. Multi-chamber fluid cartridge 710, or one or more chambers thereof, can be sealed (e.g., at a manufacturing site) prior to a user receiving the sealed multi-chamber fluid cartridge 710, thereby maintaining the sterility of multi-chamber fluid cartridge 710 and the cleansing solution therein. In some implementations, multi-chamber fluid cartridge 710 can be disposable and intended as a one-use storage receptacle. Alternatively, multi-chamber fluid cartridge 710 may be reusable or recyclable by a user, a manufacturer, a solution provider, a medical technician, or the like. Multi-chamber fluid cartridge 710 may be shaped to compatibly fit within and remain stored within an area of cleansing device 700 in any manner desired. For example, multi-chamber fluid cartridge 710 (or a lid thereof) can be shaped with a male coupling configuration while cleansing device 700 can be shaped with a female coupling configuration, such that multi-chamber fluid cartridge 710 is received into cleansing device 700 as a male to female coupling. In some examples, multi-chamber fluid cartridge 710 (or one or more chambers thereof) can include a seal, which can be pierced by a coupling of cleansing device 700 during and/or after insertion of multi-chamber fluid cartridge 710, thereby preventing contamination of the component and unused cleansing solution stored therein.

Release of unused cleansing solution from multi-chamber fluid cartridge 710 and/or draining of used cleansing solution from cleansing device 700 may be controlled by actuation of valve 702 and/or valve 706. Valve 702 may actuate to controllably release fresh, unused cleansing solution from unused cleansing solution chamber 712, through fluid transfer line 704, into one or more portions of housing 105. Valve 702 can be controlled by control processor 115, as described above with reference to FIG. 1. For example, valve 702 may be actuated to release a preset portion of the unused cleansing solution that corresponds to the type of cleansing cycle being performed by control processor 115. In implementations in which multi-chamber fluid cartridge 710 includes multiple unused cleansing solution chambers, additional lines and valves can be included, as is desired, to control the flow of fresh, unused cleansing solution from the other chambers. Valve 706 may actuate to release used cleansing solution from one or more portions of housing 105, through fluid transfer line 708, into used cleansing solution chamber 714. During a cleansing cycle and/or storing mode, the cleansing solution that was used during the cleansing cycle is converted from being fresh, unused cleansing solution to being used cleansing solution. Upon completion of a cleansing cycle and/or storage mode, cleansing device 700 can operate to drain the then used cleansing solution from baskets 107a-107n into fluid transfer line 708 for storage at used cleansing solution chamber 714. Used cleansing solution chamber 714 can store any used liquid, solution, particulates, and/or the like. For example, used cleansing solution chamber 714 can store contact solution after it has been used to cleans contact lenses. In some aspects, used cleansing solution from used cleansing solution chamber 714 can be collected and used for testing and diagnostic purposes, such as by returning or mailing multi-chamber fluid cartridge 710 to the manufacturer or a medical testing facility after use and removal from cleansing device 700. The testing and diagnostic purposes can test and diagnose one or more users of cleansing device 700 and/or be used in case studies involving a statistically significant number of subjects.

Multi-channel fluid cartridge 710 may include one or more sensors 731 to analyze or measure one or more aspects of unused cleansing solution stored at unused cleansing solution chamber 712, used cleansing solution stored at used cleansing solution chamber 714, or both, and to output corresponding data. As an example, sensors 731 may include one or more testing and/or diagnostic sensors and the data may indicate presence of one or more particulates within the unused or used cleansing solution, a pH of the unused or used cleansing solution, or the like, or any combination thereof. The data can be communicated to control processor 115 and/or stored in memory 118, for use in running analytics on the collected data by control processor 115 and/or display of a graphics user interface (GUI) via output 117, as further described above with reference to FIG. 1. Control processor 115 can also transmit the analytics and/or the raw data to a central computing device (e.g., server, computer, laptop, smart watch, smart phone, tablet, and/or the like), as described further above with reference to FIGS. 3-4. As another example, sensors 731 may include a level sensor that is configured to measure a level (e.g., a quantity) of unused cleansing solution stored in unused cleansing solution chamber 712. In some such implementations, the data indicating the level of unused cleansing solution may be communicated to control processor 115 for comparison to a threshold, and if the level fails to satisfy the threshold, control processor 115 may initiate display of a GUI via output 117 that presents a reminder to order a new multi-chamber fluid cartridge 710. To illustrate, unused cleansing solution chamber 712 may be configured to store enough cleansing solution to support operation of cleansing device 700 for a first time period (e.g., a month), and the threshold may correspond to a level of unused cleansing solution that supports operation of cleansing device 700 for a second time period (e.g., a week) that is shorter than the first time period. Additionally or alternatively, multi-chamber fluid cartridge 710 may include an indicator (not shown), such as a light or other visual indicator, that is configured to activate based on the data from sensors 731 indicating that the level fails to satisfy the threshold. Activation of the indicator may be interpreted by a user of multi-chamber fluid cartridge 710 as a reminder to order a new multi-chamber fluid cartridge. In some other implementations, sensors 731 may include a level sensor configured to measure a level of used cleansing solution stored at used cleansing solution chamber 714, and similar operations may be performed based on the level satisfying a different threshold.

In some implementations, multi-chamber fluid cartridge 710 may include, incorporate, or have affixed to it identifier 720. Identifier 720 may include a wireless transmitter or other component configured to communicate identification information associated with multi-chamber fluid cartridge 710 to cleansing device 700. For example, identifier 720 may include a radio frequency identifier (RFID) tag, as further described with reference to FIG. 8. Control processor 115 may be configured to compare the received identification information to known valid identification information to determine whether to accept or reject multi-chamber fluid cartridge 710 upon installation in cleansing device 700, as further described with reference to FIG. 8.

During operation, a user may install (e.g., reversibly mate/couple) multi-chamber fluid cartridge 710 to cleansing device 700. At the time of installation of multi-chamber fluid cartridge 710, unused cleansing solution chamber 712 may store fresh, unused cleansing solution (e.g., a full amount of cleansing solution) and used cleansing solution chamber 714 may be empty. During performance of cleansing cycle(s) at cleansing device 700, portions of the unused cleansing solution stored at unused cleansing solution chamber 712 may be transferred, via fluid transfer line 704, to housing 105 based on actuation of valve 702 by control processor 115. An amount that valve 702 is opened, a duration that valve 702 is actuated, or the like, may be determined based on the type of cleansing cycle(s) being performed, and the determined amount, duration, etc., controls the amount of unused cleansing solution transferred from unused cleansing solution chamber 712. After completion of the cleansing cycle(s), the used cleansing solution may be drained from housing 105, via fluid transfer line 708, into used cleansing solution chamber 714 based on actuation of valve 706 by control processor 115. The above-described operations may be repeated to support performance of multiple cleansing cycles at cleansing device 700, with performance of each cleansing cycle reducing the amount of unused cleansing solution stored at unused cleansing solution chamber 712 and increasing the amount of used cleansing solution stored at used cleansing solution chamber 714. Such cleansing cycles may be performed until unused cleansing solution chamber 712 is substantially empty, or in some implementations, detection of a particular level of remaining unused cleansing solution (e.g., less than one or two cleansing cycle's worth of solution) by sensors 731 may prevent performance of any additional cleansing cycles. At this point in time, or any time previously, the user may decouple multi-chamber fluid cartridge 710 from cleansing device 700 and remove it, optionally replacing it with a new, unused multi-chamber fluid cartridge. In some implementations, multi-chamber fluid cartridge 710 is disposable, and the user may throw away or otherwise dispose of multi-chamber fluid cartridge 710 after removal. Alternatively, the user may return multi-chamber fluid cartridge 710, after removal, to a manufacturer, to a medical testing facility, or to a medical waste processing facility, for recycling or for diagnostics and testing of the used cleansing solution.

Figure 8:
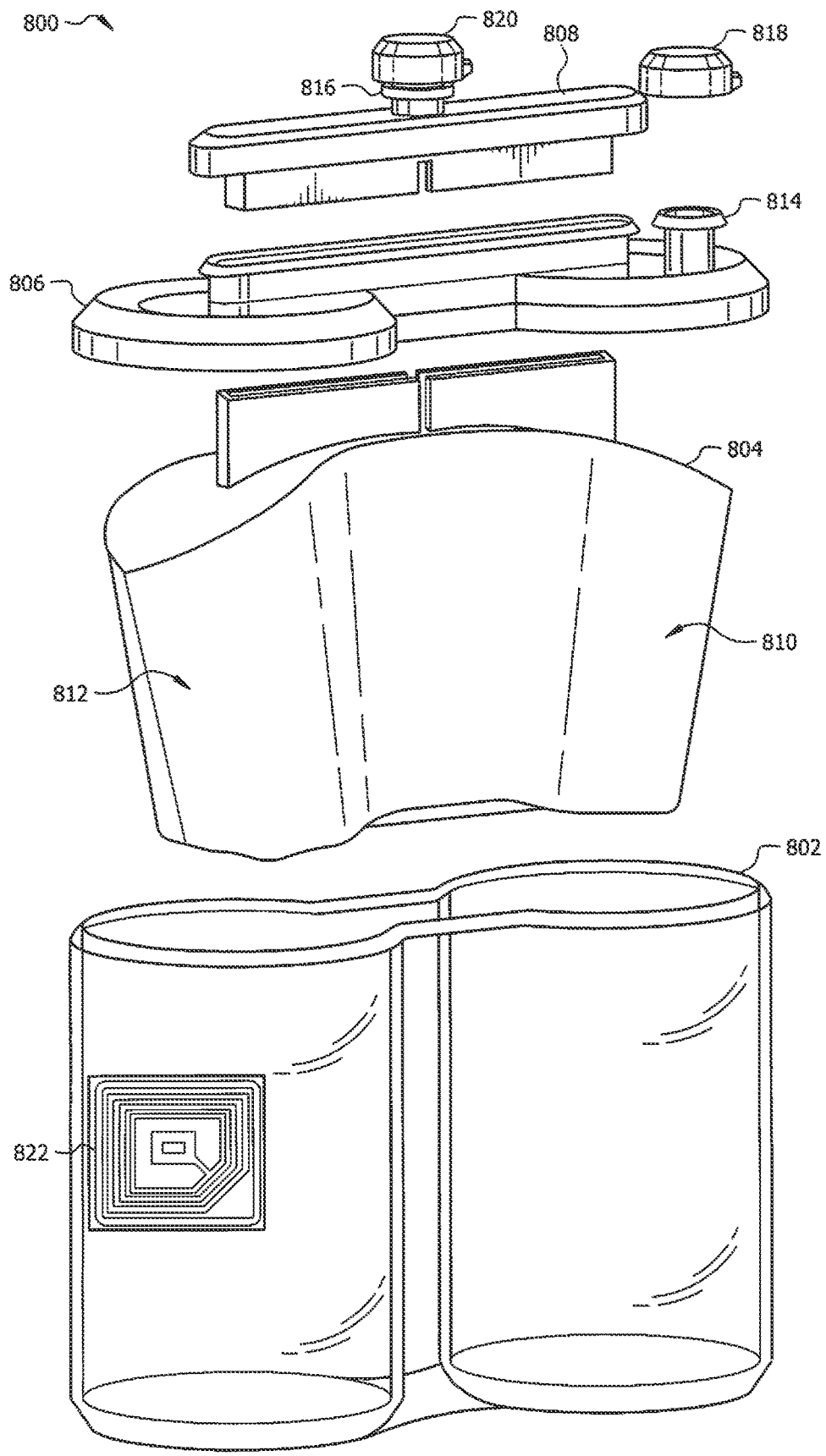
FIG. 8 shows an example of a multi-chamber fluid cartridge according to one or more aspects disclosed herein.

FIG. 8 shows an example of multi-chamber fluid cartridge 800 according to one or more aspects. In some implementations, multi-chamber fluid cartridge 800 may include or correspond to multi-chamber fluid cartridge 710 of FIG. 7. As shown in FIG. 8, multi-chamber fluid cartridge 800 includes a housing 802, a bladder 804, and one or more lids. In the implementation shown in FIG. 8, the one or more lids includes a first lid 806 and a second lid 808. In other implementations, the one or more lids may include a single lid or more than two lids, or any other capping structure configured to close an opening of housing 802 when bladder 804 is placed inside housing 802.

Housing 802 may be a rigid structure that defines one or more walls of a cavity that is configured to at least partially surround bladder 804, and optionally, store any spillover cleansing solution from bladder 804. For example, housing 802 may be formed from plastic, metal, glass, or another material that is capable of supporting and at least partially surrounding bladder 804 and storing liquid, such as spillover cleansing solution. Housing 802 may have an opening that is configured to receive bladder 804 and to be covered by one or more lids, such as first lid 806. Bladder 804 may be configured to store multiple types of fluid while keeping the different types of fluid physically isolated. For example, bladder 804 may be a rigid or semi-rigid structure capable of storing liquids, such as a structure formed from rubber, plastic, glass, metal, or the like. In the implementation shown in FIG. 8, bladder 804 includes two chambers for storing two types of fluid, first chamber 810 and second chamber 812. In some implementations, first chamber 810 may be used to store unused cleansing solution, and second chamber 812 may be configured to store used cleansing solution. In some such implementations, first chamber 810 may include or correspond to unused cleansing solution chamber 712 and second chamber 812 may include or correspond to used cleansing solution chamber 714 of FIG. 7. In some other implementations, bladder 804 may include more than two chambers, such as four, six, eight, or ten chambers, as non-limiting examples. First chamber 810 may be physically isolated from second chamber 812. For example, first chamber 810 may be a first cavity that is separated from a second cavity that is second chamber 812 by one or more sidewalls. Bladder 804, or sidewalls thereof, may be formed from one or more liquid impermeable materials such that by separation of chambers 810 and 812 by one or more sidewalls, fluid stored in one chamber is unable to flow (e.g., bleed) into fluid stored in the other chamber. Each of first chamber 810 and second chamber 812 may have an opening that is configured to mate with a corresponding opening of the one or more lids (e.g., first lid 806 and/or second lid 808) to enable access to the respective chamber.

The one or more lids are configured to enclose housing 802 and to be mated with housing 802 or another of the one or more lids. For example, first lid 806 may be configured to be mated with (e.g., coupled to) housing 802, and second lid 808 may be configured to be mated with (e.g., coupled to) first lid 806. In some implementations, each of the one or more lids has at least one opening that corresponds to a respective opening in bladder 804 to enable access to one or more chambers of bladder 804. For example, first lid 806 may include a first nozzle 814 that, when first lid 806 is mated with housing 802 and bladder 804 is stored within housing 802, is aligned with an opening in bladder 804 that leads to first chamber 810. A first fluid transfer line may access first chamber 810 via first nozzle 814. As another example, second lid 808 may include a second nozzle 816 that, when second lid 808 is mated with first lid 806, is aligned with another opening in first lid 806 and an opening in bladder 804 that leads to second chamber 812. A second fluid transfer line may access second chamber 812 via second nozzle 816. Although referred to as nozzles 814 and 816, in other implementations, the one or more lids may include any type of opening that enables access by fluid transfer lines to the chambers of bladder 804. In some implementations, the one or more lids may include one or more caps configured to close respective nozzles prior to installation of multi-chamber fluid cartridge 800 within a cleansing device. For example, first lid 806 may include first cap 818 configured to be coupled to first nozzle 814, and second lid 808 may include second cap 820 configured to be coupled to second nozzle 816. In some such implementations, one or more of first cap 818 and second cap 820 may be configured to seal first nozzle 814 and second nozzle 816, respectively, such that sterilized cleansing solution may be stored within one or more chambers of bladder 804 in a sealed manner to preserve sterility. In some such implementations, removal of caps 818 or 820 or mating of nozzles 814 or 816 with corresponding openings (e.g., valves) of the cleansing device may break the seal formed by caps 818 and/or 820 (e.g., seals put in place by a manufacturer of multi-chamber fluid cartridge 800).

In some implementations, an RFID tag 822 may be affixed to housing 802, or another portion of multi-chamber fluid cartridge 800. RFID tag 822 may be configured to transmit identification information associated with multi-chamber fluid cartridge 800 to the cleansing device. Although described as RFID tag 822, in some other implementations, RFID tag 822 may be replaced with a wireless communication component, such as a wireless transmitter or transceiver, or some other component, capable of transmitting identification information to the cleansing device as described herein. RFID tag 822 may enable multi-chamber fluid cartridge 800 to be exclusively paired with cleansing devices manufactured by the same manufacturer (or a designated manufacturing partner), and may ensure that automated cleansing devices only use cartridges manufactured by the manufacturer and/or filled with a designated partner's cleansing solution. To illustrate, the cleansing device may be configured to determine whether to accept or reject cartridges upon insertion (e.g., installation) within the cleansing device. This acceptance, or rejection, may be based on the identification information provided by RFID tag 822. For example, the cleansing device may compare the identification information provided by RFID tag 822 to approved identification information stored at a memory of the cleansing device, such as information that is stored during deployment of the cleansing device and/or information that is received via one or more updates. If the received identification information matches at least some of the approved identification information, the cleansing device may accept multi-chamber fluid cartridge 800 and perform operations as described above with reference to FIG. 7. However, if the received identification does not match at least some of the approved identification information, the cleansing device may reject the cartridge as an unapproved or unlicensed cartridge, including refraining from performing any cleansing cycles until an approved cartridge is installed, notifying a user of the rejection via a user interface, or the like.

In some implementations, multi-chamber fluid cartridge 800 may include one or more sensors, and optionally, an indicator (not shown). The sensors may include one or more level sensors configured to measure a level of solution stored in one or more of the chambers, sensors configured to measure characteristics (e.g., a pH, presence of one or more particulates, a temperature, other characteristics, or the like) of the stored solution, other types of sensors, or a combination thereof. Data generated by the sensors may be transmitted to the cleansing device for processing and operations at the cleansing device, such as providing a user with a notification that an anomaly is detected in stored cleansing solution (unused or used), that a level of unused fluid is low and the cartridge should be replaced, or the like. Additionally or alternatively, the indicator may be activated based on a detected level of solution in one or more of the chambers. For example, the indicator may be a light or other type of visual indicator, and the light may be activated when a level of unused cleansing solution stored in first chamber 810 fails to satisfy a threshold. As a particular example, multi-chamber fluid cartridge 800 may be configured to store enough cleansing solution to support one month's worth of daily cleansing cycles, and the indicator (e.g., the light) may be activated when the amount of unused cleansing solution stored in first chamber 810 reaches an amount that supports one week of daily cleansing cycles, thereby notifying the user to order a new cartridge before the cleansing solution is fully used.

Figure 9A:
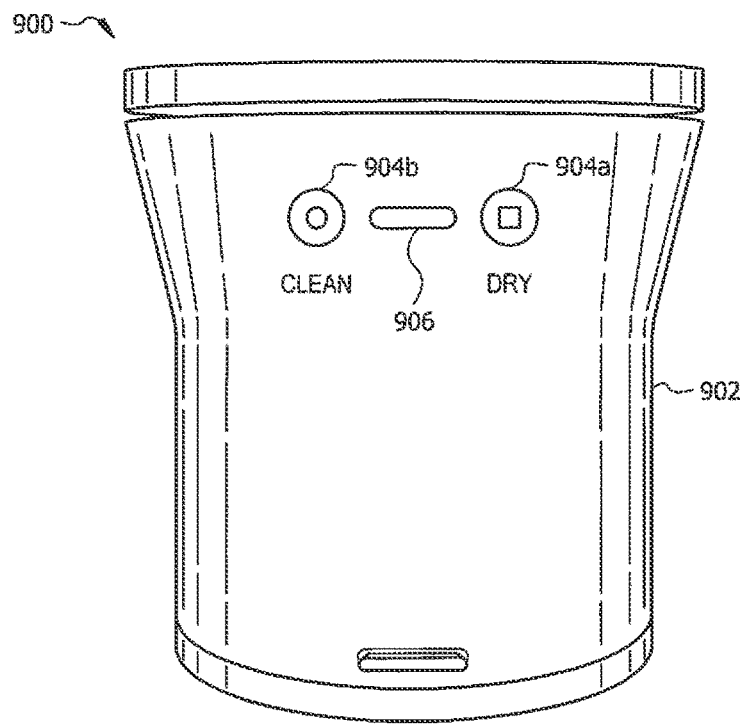
FIG. 9A shows aspects of an exemplary implementation of a cleansing device that includes multi-chamber fluid cartridge as disclosed herein.

FIGS. 9A-9D show exemplary implementations of contact lens cleansing device 900. FIG. 9A shows an example implementation of contact lens cleansing device 900 as can be seen from a user viewing it on a counter, table, and/or the like. Contact lens cleansing device 900 can be a handheld cleansing device, made of light weight material, and can easily be placed and/or stored on a bathroom countertop, transported in a suitcase and/or bag, and purchased over the counter and/or shipped in a relatively small and light shipping box.

Cleansing device 900 can include housing 902. Housing 902 may include user inputs 904a and 904b and user output 906. User inputs 904a and 904b (e.g., buttons, switches, plungers, etc.) can receive input from a user. In the implementation shown in FIG. 9A, user input 904a includes a dry button (e.g., a button to initiate a drying process) and user input 904b includes a clean button (e.g., a button to initiate one or more cleansing cycles). User output 906 may include an LED screen, touchscreen, and/or other type of display screen (e.g., a flexible screen, a MEMS screen, and/or the like), one or more lights, one or more visual or displayable indicators, or any combination thereof.

Figure 9B:
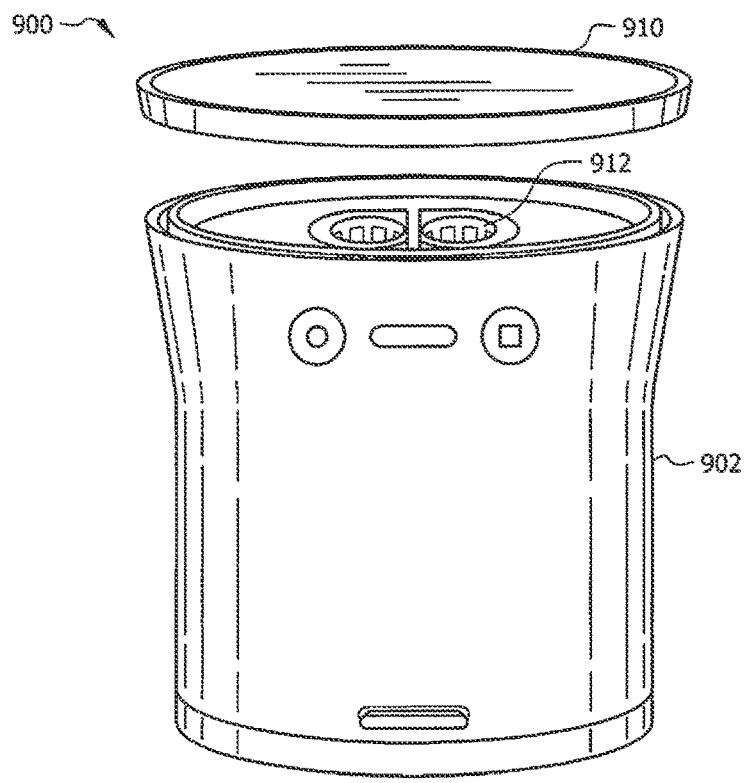
FIG. 9B shows other aspects of an exemplary implementation of a cleansing device that includes a multi-chamber fluid cartridge as disclosed herein.

FIG. 9B shows an example of cleansing device 900, wherein some of the internal components are in view. Lid 910 is removed such from housing 902 such that a partial interior is visible in FIG. 9B. Cleansing device 900 may include one or more baskets 912, within which contacts (and/or any item desiring of cleansing) can be placed for cleansing, for example one contact lens per basket. In some implementations, baskets 912 may lower into a cleansing reservoir (not shown). Alternatively, removal of lid 910 may enable view of a cleansing reservoir, and baskets 912 may be stationary.

Figure 9C:
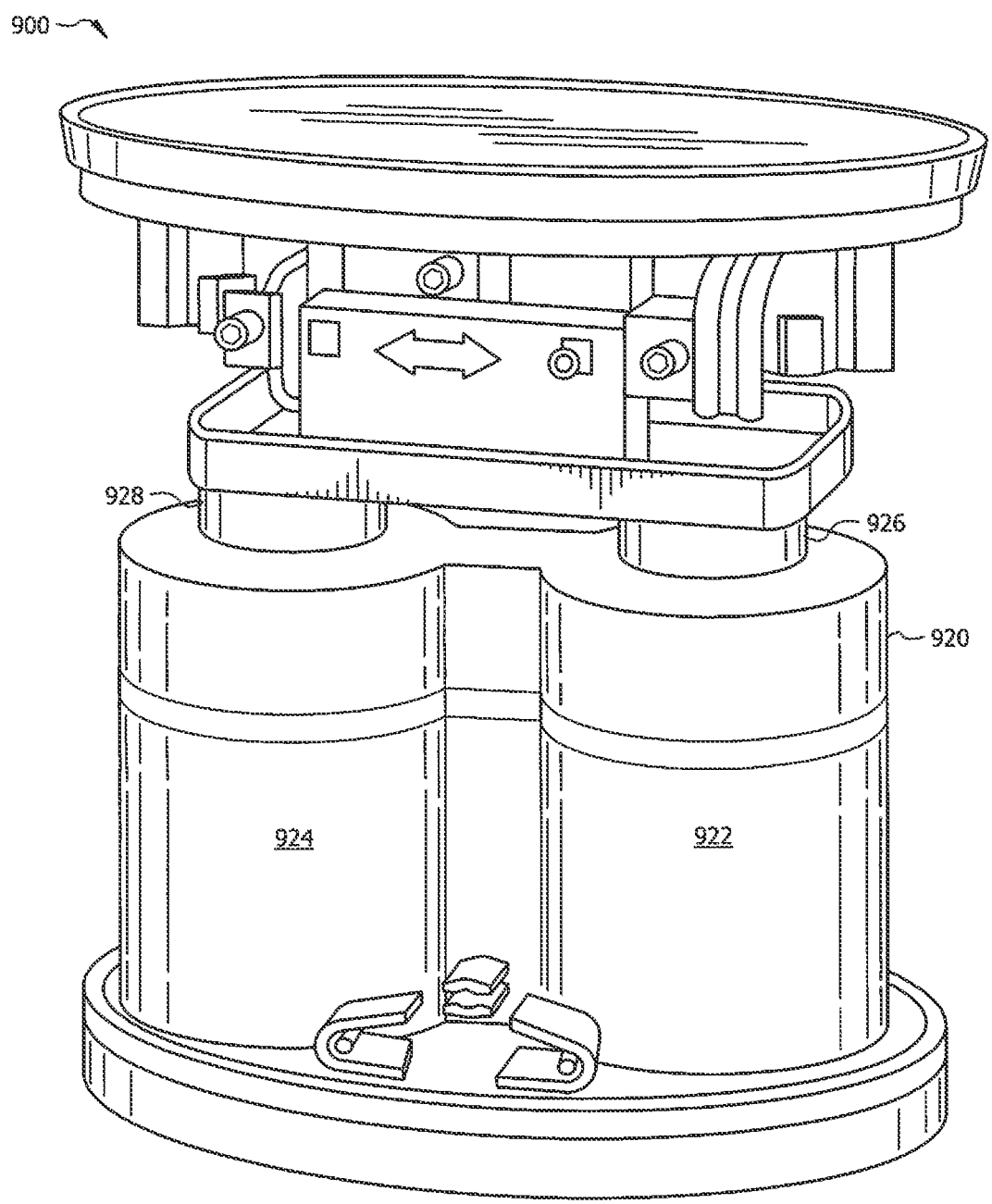
FIG. 9C shows other aspects of an exemplary implementation of a cleansing device that includes a multi-chamber fluid cartridge as disclosed herein.
Figure 9D:
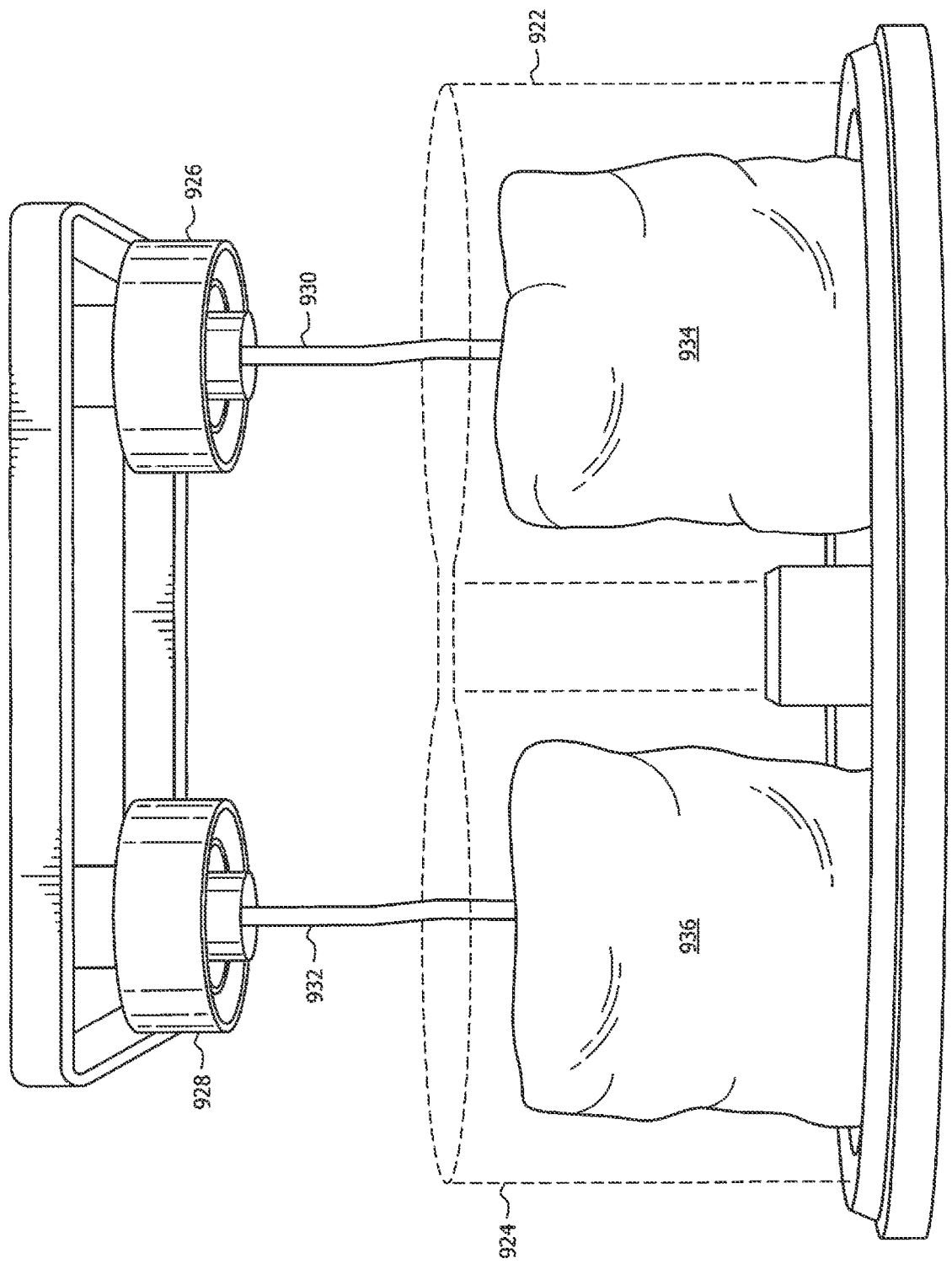
FIG. 9D shows other aspects of an exemplary implementation of a cleansing device that includes a multi-chamber fluid cartridge as disclosed herein.

FIGS. 9C and 9D show example components that can be located within housing 902 of cleansing device 900. In FIGS. 9C and 9D, housing 902 is not shown. Referring to FIGS. 9C and 9D jointly, multi-chamber fluid cartridge 920 is installed within cleansing device 900 (e.g., is seated within a mounting mechanism such as a saddle, a cradle, a coupler, a repository, or the like). In some aspects, multi-chamber fluid cartridge 920 includes first chamber 922 configured to store unused cleansing solution and second chamber 924 configured to store used cleansing solution. Upon installation of multi-chamber fluid cartridge 920, first chamber 922 is substantially full of unused cleansing solution and second chamber 924 is empty. In some aspects, multi-chamber fluid cartridge 920 includes one or more nozzles (or other openings) that may be used to couple to cleansing device 900 and to enable access to corresponding chambers. For example, multi-chamber fluid cartridge 920 may include first nozzle 926 configured to be coupled to a coupling mechanism (e.g., another nozzle, a threaded opening, or the like) of cleansing device 900 and to enable access to first chamber 922. As another example, multi-chamber fluid cartridge 920 may include second nozzle 928 configured to be coupled to a coupling mechanism of cleansing device 900 and to enable access to second chamber 924. In some implementations, one or more of the coupling mechanisms of cleansing device 900 may include a piercing member (not shown), such that, when multi-chamber fluid cartridge 920 is coupled to cleansing device 900, the piercing member pierces a sealed cover of first nozzle 926 or second nozzle 928, allowing access to first chamber 922 or second chamber 924 in a controlled manner. Prior to the piercing of the sealed cover, the sealed cover can prevent the contents of multi-chamber fluid cartridge 920 from becoming contaminated and provide a visual indicator to a user regarding whether multi-chamber fluid cartridge 920 has been tampered with and/or previously used.

Upon coupling of multi-chamber fluid cartridge 920 to cleansing device 900, one or more lines may access the chambers of multi-chamber fluid cartridge 920. For example, first fluid transfer line 930 may access first chamber 922 and second fluid transfer line 932 may access second chamber 924. First fluid transfer line 930 enables unused cleansing solution 934 to be withdrawn from multi-chamber fluid cartridge 920 and be provided to the cleansing reservoir within cleansing device 900 for performance of one or more cleansing cycles, such as contact lens cleansing cycle(s), device self-cleansing cycle(s), other cleansing cycle(s), or any combination thereof. Second fluid transfer line 932 enables used cleansing solution 936 (e.g., the unused cleansing solution after circulation throughout the cleansing reservoir during one or more cleansing cycles) to be drained from the cleansing reservoir of cleansing device 900 to the second chamber 924. Thus, during operation of cleansing device 900, the amount (e.g., the level) of unused cleansing solution 934 decreases as more and more unused cleansing solution 934 is withdrawn for use by cleansing device 900, and the amount (e.g., the level) of used cleansing solution 936 increases as more and more used cleansing solution 936 is drained from cleansing device 900 for storage in second chamber 924. In some implementations, multi-chamber fluid cartridge 920 may include one or more sensors and an indicator (e.g., a light) that are configured such that the indicator is activated when the one or more sensors detect that the amount (e.g., the level) of unused cleansing solution 934 no longer satisfies a threshold (or when the amount of used cleansing solution 936 satisfies a threshold), as further described above with reference to FIGS. 7-8.

Figure 10:
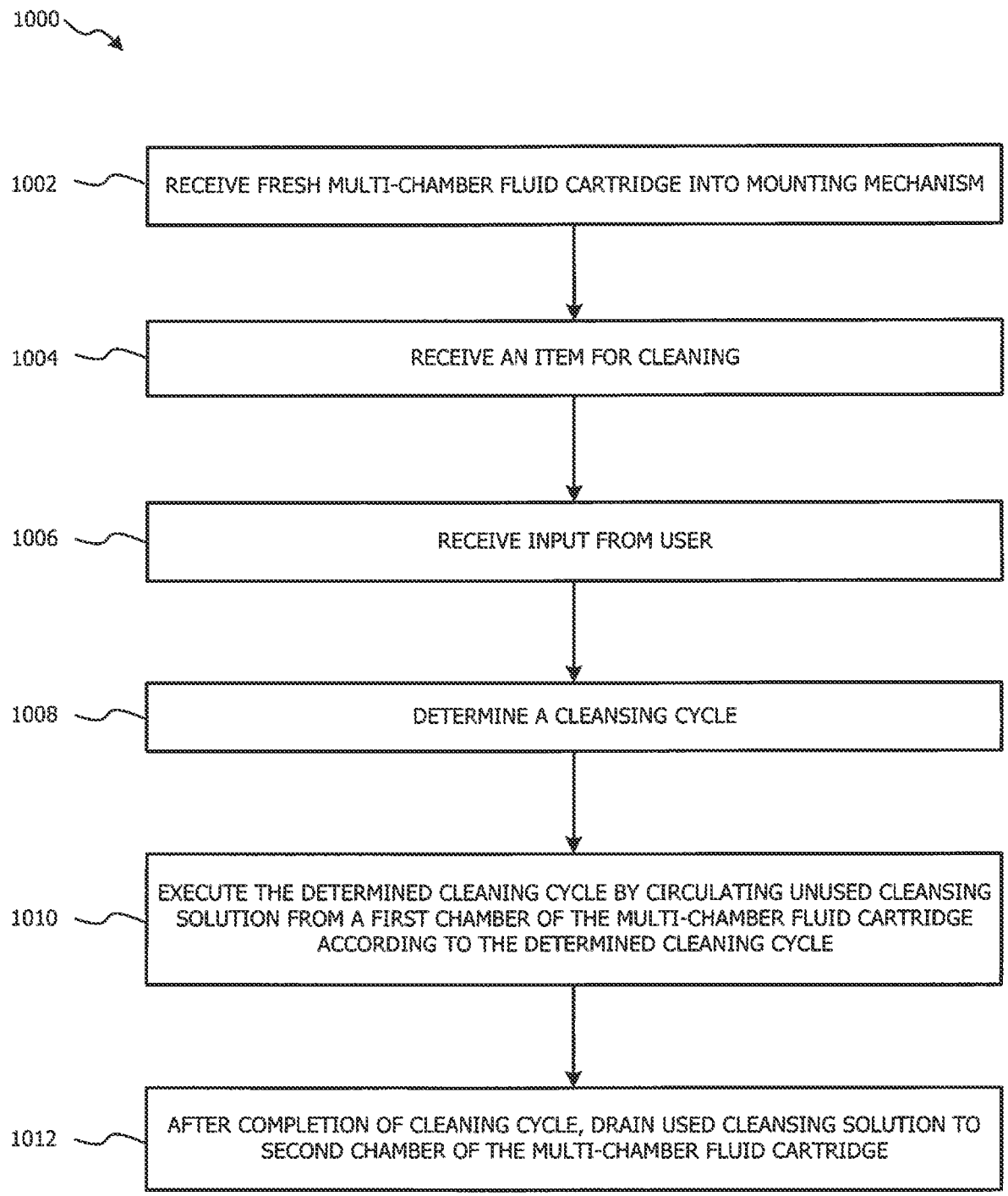
FIG. 10 is a flow diagram of an example of another method involving systems and devices disclosed herein.

FIG. 10 illustrates an example method 1000 of using the devices disclosed herein. In some implementations, one or more of the operations described with reference to method 1000 may be performed by one or more of cleansing device 700 and multi-chamber fluid cartridge 710 of FIG. 7, multi-chamber fluid cartridge 800 of FIG. 8, and cleansing device 900 and multi-chamber fluid cartridge 920 of FIGS. 9A-9D. Although FIG. 10 illustrates a particular order of operations of method 1000, in other implementations, one or more operations can be omitted and/or can be done in a different order. At 1002, a cleansing device receives a fresh multi-chamber fluid cartridge into a mounting mechanism. For example, a user may open a door of the cleansing device, place a new (e.g., unused) multi-chamber fluid cartridge on a mounting mechanism, reversibly mate (e.g., couple) the multi-chamber fluid cartridge to the cleansing device, and close the door. At 1004, the cleansing device receives an item for cleaning. For example, the user may open a lid of the cleansing device, place contact lenses in baskets within the cleansing device, and close the lid. At 1006, the cleansing device receives input from the user. For example, the user may press a button of the cleansing device to indicate that a cleansing cycle is desired, or the user may enter a selection of a cleansing cycle via input of the cleansing device. At 1008, the cleansing device determines which cleansing cycle to perform. For example, the cleansing cycle may be determined based on which button is pressed by the user or based on input received from the user via a UI.

At 1010, the cleansing device executes the determined cleansing cycle by circulating unused cleansing solution from a first chamber of the multi-chamber fluid cartridge according to the determined cleansing cycle's schedule. For example, based on the determined cleansing cycle, a corresponding amount of unused cleansing solution may be transferred from the first chamber to the cleansing device for circulation during the cleansing cycle. In some aspects, a cleansing cycle can include any combination of period of circulation, soaking, lighting, heating, vibrating, and/or the like. Upon completion of the cleansing cycle, at 1012, the cleansing device drains used cleansing solution to a second chamber of the multi-chamber fluid cartridge. For example, the now-used cleansing solution may be drained from the cleansing device to the second chamber for storage, and the user may open the lid and remove the clean contact lenses from the basket. In some other implementations, the cleansing device may enter a storage mode, and additional unused cleansing solution may be transferred from the first chamber to the cleansing device for the duration of the storage mode, before being drained after termination of the storage mode. Additionally or alternatively, after removal of the contact lenses, the cleansing device may initiate a self-cleansing cycle, during which additional unused cleansing solution may be transferred from the first chamber to the cleansing device for circulation during the self-cleansing cycle and, upon completion of the self-cleansing cycle, the used cleansing solution may be drained to the second chamber for storage.

FIG. 11 illustrates an example method 1100 that a cleansing device, as described herein, can execute. In some implementations, one or more of the operations described with reference to method 1100 may be performed by one or more of cleansing device 700 and multi-chamber fluid cartridge 710 of FIG. 7, multi-chamber fluid cartridge 800 of FIG. 8, and cleansing device 900 and multi-chamber fluid cartridge 920 of FIGS. 9A-9D. Although FIG. 11 illustrates a particular order of operations of method 1100, in other implementations, one or more operations can be omitted and/or can be done in a different order.

Method 1100 includes reversibly mating a multi-chamber fluid cartridge to an automated contact lens cleansing device, at 1102. The multi-chamber fluid cartridge includes a first chamber configured to store unused cleansing solution for use by the automated contact lens cleansing device and a second chamber configured to store used cleansing solution that is drained from the automated contact lens cleansing device. The second chamber is physically isolated from the first chamber. For example, the multi-chamber fluid cartridge may include or correspond to multi-chamber fluid cartridge 710, the automated contact lens cleansing device may include or correspond to cleansing device 700, the first chamber may include or correspond to unused cleansing solution chamber 712, and the second chamber may include or correspond to used cleansing solution chamber 714 of FIG. 7. Method 1100 includes transferring, at a first solution transfer line of the automated contact lens cleansing device, a first portion of the unused cleansing solution from the first chamber of the multi-chamber fluid cartridge to a reservoir of the automated contact lens cleansing device, at 1104. For example, the first solution transfer line may include or correspond to fluid transfer line 704, and the reservoir may include or correspond to a portion of housing 105 of FIG. 7.

Method 1100 includes circulating the first portion of unused cleansing solution through the reservoir for a duration of the at least one cleansing cycle, at 1106. After circulation the first portion of the unused cleansing solution includes a first portion of the used cleansing solution. For example, the circulation may be performed using circulators 106a-106n of FIG. 7. In some implementations, the at least one cleansing cycle includes at least one of a plurality of cleansing cycles each having at least one different characteristic, and the at least one different characteristic includes one or more circulation rates, a type of cleansing solution, a pulsing rate, or a combination thereof. Method 1100 includes transferring, at a second solution transfer line of the automated contact lens cleansing device, the first portion of the used cleansing solution from the reservoir to the second chamber of the multi-chamber fluid cartridge, at 1108. For example, the second solution transfer line may include or correspond to fluid transfer 708 line of FIG. 7.

In some implementations, the multi-chamber fluid cartridge further includes a bladder configured to store multiple types of fluid, a housing configured to at least partially surround the bladder, and one or more lids configured to be mated with the housing or another of the one or more lids. The bladder includes the first chamber and the second chamber. For example, the bladder may include or correspond to bladder 804 that includes first chamber 810 and second chamber 812, the housing may include or correspond to housing 802, and the one or more lids may include or correspond to first lid 806 and/or second lid 808 of FIG. 8. In some such implementations, the first solution transfer line of the automated contact lens cleansing device accesses the first chamber via a first opening of the one or more lid and the second solution transfer line of the automated contact lens cleansing device accesses the second chamber via a second opening of the one or more lids. For example, the first opening may include or correspond to first nozzle 814 and the second opening may include or correspond to second nozzle 816 of FIG. 8. Additionally or alternatively, prior to reversibly mating the multi-chamber fluid cartridge to the automated contact lens cleansing device, the first chamber may store an entirety of the unused cleansing solution and the second chamber may be empty, and after performance of multiple cleansing cycles by the automated contact lens cleansing device, the first chamber may be substantially empty and the second chamber may store the used cleansing solution.

In some implementations, method 1100 further includes approving the multi-chamber fluid cartridge based on a comparison of identification information received from an RFID tag affixed to the multi-chamber fluid cartridge and approved identification information. For example, the RFID tag may include or correspond to identifier 720 of FIG. 7 or RFID tag 822 of FIG. 8. Additionally or alternatively, method 1100 may also include displaying, at a user interface of the automated contact lens cleansing device, a reminder to order a new multi-chamber fluid cartridge to a user based on data received from one or more sensors of the multi-chamber fluid cartridge indicating that a level of the unused cleansing solution fails to satisfy a threshold. For example, the user interface may include or correspond to input 116 and output 117, and the one or more sensors may include or correspond to sensors 731 of FIG. 7. Additionally or alternatively, method 1100 may further include displaying, at a user interface of the automated contact lens cleansing device, a choice of replacement component options associated with the automated contact lens cleansing device and receiving, at the user interface, input from a user indicating selection of at least one of the replacement component options. For example, the user interface may include or correspond to input 116 and output 117 of FIG. 7.

Although the present example aspects and their advantages have been described in detail, it should be understood that various changes, substitutions and alterations can be made herein without departing from the scope of the described aspects as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, various processes, machines, manufacture, compositions of matter, means, methods, or steps, presently existing or later to be developed that perform substantially the same function or achieve substantially the same result as the corresponding implementations described herein can be utilized according to the present application. Accordingly, the appended claims are intended to include within their scope such processes, machines, manufacture, compositions of matter, means, methods, or steps.

The invention claimed is:

1. A system for automated cleansing of a contact lens, the system comprising:
a multi-chamber fluid cartridge configured to reversibly mate with an automated contact lens cleansing device that is configured to perform one or more cleansing cycles on one or more contact lenses, the multi-chamber fluid cartridge comprising:

a first chamber configured to store unused cleansing solution for use by the automated contact lens cleansing device;

a second chamber configured to store used cleansing solution that is drained from the automated contact lens cleansing device, the second chamber physically isolated from the first chamber; and an identifier configured to wirelessly transmit identification information associated with the multi-chamber fluid cartridge to the automated contact lens cleansing device, where the identification information enables acceptance of the multi-chamber fluid cartridge by the automated contact lens cleansing device based on the identification information matching approved identification information.

2. The system of claim 1, where the multi-chamber fluid cartridge further comprises:

a bladder configured to store multiple types of fluid, the bladder comprising the first chamber and the second chamber;

a housing configured to at least partially surround the bladder; and one or more lids configured to be mated with the housing or another of the one or more lids.

3. The system of claim 2, where the one or more lids comprise:

a first valve configured to enable access to the first chamber by a first solution transfer line of the automated contact lens cleansing device; and a second valve configured to enable access to the second chamber by a second solution transfer line of the automated contact lens cleansing device.

4. The system of claim 1, where the identifier comprises a wireless transmitter or transceiver.

5. The system of claim 1, where the identifier comprises a radio frequency identification (RFID) tag.

6. The system of claim 1, where the multi-chamber fluid cartridge is disposable.

7. The system of claim 1, further comprising the automated contact lens cleansing device, where the automated contact lens cleansing device comprises:

a first solution transfer line configured to transfer the unused cleansing solution from the first chamber of the multi-chamber fluid cartridge;

a reservoir configured to store the unused cleansing solution received from the first solution transfer line;

at least one circulator configured to circulate the unused cleansing solution through the reservoir for a duration of at least one cleansing cycle, where after circulation the unused cleansing solution comprises the used cleansing solution;

a second solution transfer line configured to transfer the used cleansing solution from the reservoir to the second chamber of the multi-chamber fluid cartridge; and a processor configured to:
control the first solution transfer line, the second solution transfer line, and the at least one circulator to perform the at least one cleansing cycle; and
accept the multi-chamber fluid cartridge based on the identification information matching the approved identification information.

8. The system of claim 2, where the identifier is coupled to the housing.

9. The system of claim 7, where the multi-chamber fluid cartridge further comprises:

one or more sensors configured to measure a level of the unused cleansing solution stored in the first chamber; and an indicator configured to indicate when the level of the unused cleansing solution fails to satisfy a threshold.

10. The system of claim 9, where the automated contact lens cleansing device further comprises:

a user interface configured to display a reminder to order a new multi-chamber fluid cartridge to a user based on data received from the one or more sensors indicating that the level of the unused cleansing solution fails to satisfy the threshold.

11. The system of claim 7, where the automated contact lens cleansing device further comprises:

a user interface configured to display a choice of replacement component options associated with the automated contact lens cleansing device and to receive input from a user indicating selection of at least one of the replacement component options.

12. The system of claim 11, where the automated contact lens cleansing device further comprises:

one or more sensors configured to collect data relating to a condition of one or more components of the automated contact lens cleansing device; and a transceiver configured to transmit the condition of the one or more components, diagnostic information relating to the automated contact lens cleansing device, or both.

13. The system of claim 7, where the automated contact lens cleansing device further comprises:

one or more sensors configured to collect data relating to a condition of the one or more contact lenses, information relating to a user of the automated contact lens cleansing device, or both; and a transceiver configured to transmit the condition of the one or more contact lenses, the information relating to the user, or both.

14. The system of claim 13, where the automated contact lens cleansing device further comprises:

a user interface configured to display the condition of the one or more contact lenses or the information relating to the user and to receive input from the user that indicates selection of one of a plurality of cleansing cycles.

* * * * *